United States Patent
Haupt et al.

(10) Patent No.: US 11,247,729 B2
(45) Date of Patent: Feb. 15, 2022

(54) VEHICLE BODY STRUCTURE

(71) Applicant: Nissan North America, Inc., Franklin, TN (US)

(72) Inventors: Brian Haupt, Farmington Hills, MI (US); Christian Herrington, Walled Lake, MI (US); Heather Kelley, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 6 days.

(21) Appl. No.: 16/863,171

(22) Filed: Apr. 30, 2020

(65) Prior Publication Data

US 2021/0339803 A1 Nov. 4, 2021

(51) Int. Cl.
  *B62D 25/02* (2006.01)
  *B62D 25/04* (2006.01)
  *B62D 27/02* (2006.01)

(52) U.S. Cl.
  CPC ........... *B62D 25/025* (2013.01); *B62D 25/04* (2013.01); *B62D 27/023* (2013.01)

(58) Field of Classification Search
  CPC ........................... B62D 25/025; B62D 27/023
  USPC ............................................ 296/209, 187.12
  See application file for complete search history.

(56) References Cited

U.S. PATENT DOCUMENTS

| | | | |
|---|---|---|---|
| 6,053,564 A | 4/2000 | Kamata et al. | |
| 8,308,227 B2 | 11/2012 | Tsuruta et al. | |
| 8,641,131 B2 | 2/2014 | Honda et al. | |
| 9,555,839 B2 | 1/2017 | Lakic et al. | |
| 2019/0241217 A1 | 8/2019 | Hanaoka | |

FOREIGN PATENT DOCUMENTS

| | | |
|---|---|---|
| DE | 102012001938 A1 | 8/2013 |
| DE | 102017220881 B3 | 2/2019 |

*Primary Examiner* — Dennis H Pedder
(74) *Attorney, Agent, or Firm* — Global IP Counselors, LLP

(57) ABSTRACT

A vehicle body structure includes an inner sill member, an outer sill member and a first reinforcement bracket. The inner sill member has an inner upper flange, a horizontally extending section and an inner lower flange extending downward from the horizontally extending section. The outer sill member has an outer upper flange and an outer lower flange. The inner upper flange and the outer upper flanges are fixedly attached to one another. The inner lower flange and the outer lower flanges are fixedly attached to one another defining a sill structure with hollow interior. The first reinforcement bracket is disposed within the hollow interior and has an outboard portion fixedly attached to the outer sill member and an inboard portion fixedly attached to the horizontally extending section of the inner sill member.

18 Claims, 17 Drawing Sheets

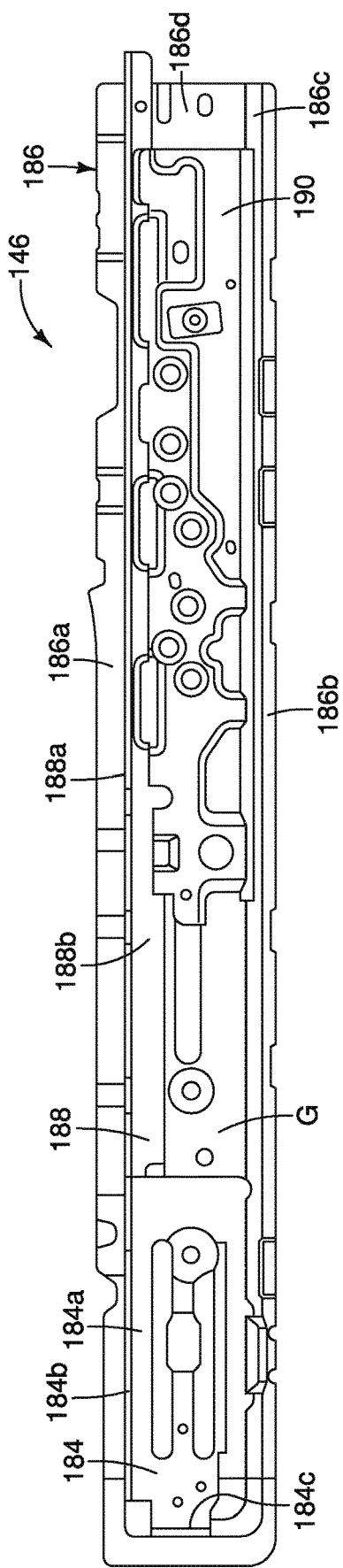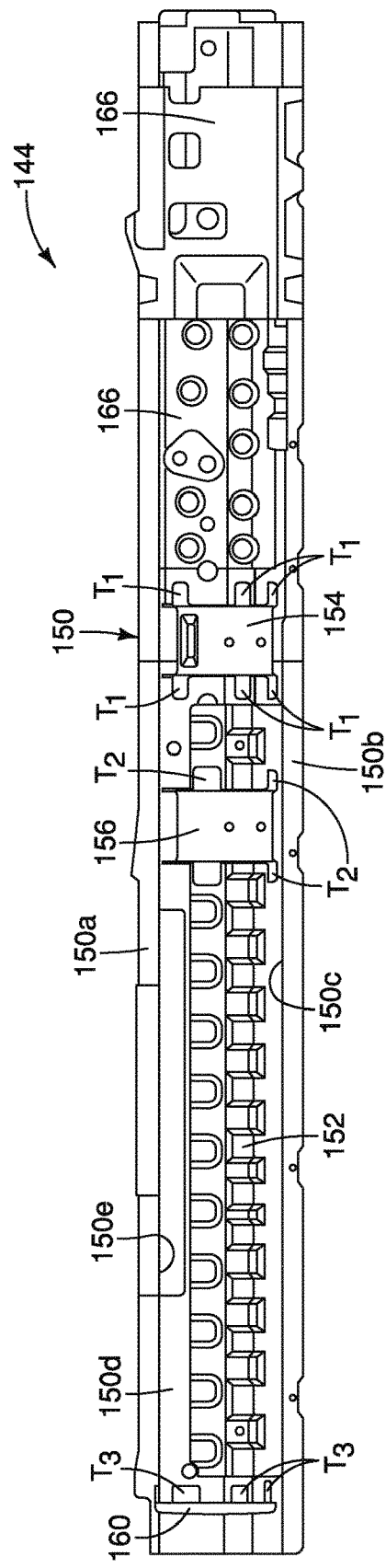
FIG. 15
FIG. 16

VEHICLE BODY STRUCTURE

BACKGROUND

Field of the Invention

The present invention generally relates to a vehicle body structure that includes a sill structure. More specifically, the present invention relates to a vehicle body structure that includes a reinforcement member located within a hollow interior of a sill structure.

Background Information

Vehicle body structures are routinely being modified and re-designed to fine tune the structural integrity of automotive vehicles.

SUMMARY

One object of the present disclosure is to modify the design of a sill structure of a vehicle body structure to include a reinforcement member located within a hollow interior of the sill structure.

In view of the state of the known technology, one aspect of the present disclosure is to provide a vehicle body structure with an inner sill member, an outer sill member and a first reinforcement bracket. The inner sill member has an inner upper flange, a horizontally extending section and an inner lower flange extending downward from the horizontally extending section. The outer sill member has an outer upper flange and an outer lower flange. The inner upper flange and the outer upper flanges are fixedly attached to one another. The inner lower flange and the outer lower flanges are fixedly-attached to one another defining a sill structure with hollow interior. The first reinforcement bracket is disposed within the hollow interior and has an outboard portion fixedly attached to the outer sill member and an inboard portion fixedly attached to the horizontally extending section of the inner sill member.

BRIEF DESCRIPTION OF THE DRAWINGS

Referring now to the attached drawings which form a part of this original disclosure:

FIG. 15 is a side view of an outboard side of the inner sill assembly separated from the sill structure showing the various elements thereof including the second reinforcement bracket in accordance with the second embodiment;

FIG. 16 is a side view of an inboard side of the outer sill assembly separated from the sill structure showing the various elements thereof without the first reinforcement bracket in accordance with the second embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
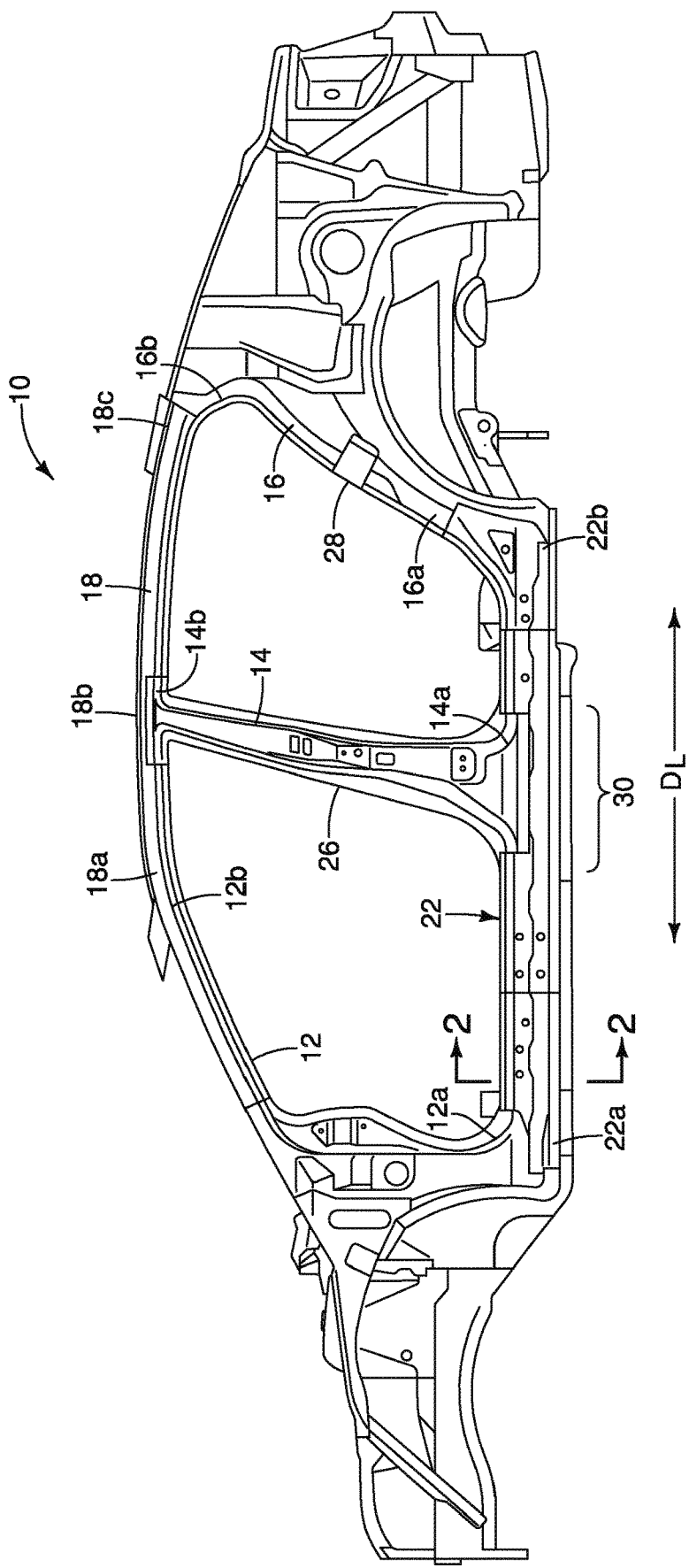
FIG. 1 is a side view of a vehicle body structure of an automotive vehicle that includes an A-pillar, a B-pillar, a C-pillar and a sill structure in accordance with a first embodiment.

Referring initially to FIG. 1, a vehicle body structure 10 is illustrated in accordance with a first embodiment.

The vehicle body structure 10 includes numerous panels that when assembled define a plurality of structures, including, an A-pillar 12, a B-pillar 14, a C-pillar 16, a roof rail structure 18, a floor structure 20 (FIGS. 2 and 7-9) and a sill structure 22.

It should be understood from the drawings and the description hereinbelow that there are two A-pillar 12, two B-pillars 14, two C-pillars 16, two roof rail structures 18 and two sill structures 22, one of each on each of the two sides of the vehicle body-structure 10. Since the vehicle body structure 10 is generally symmetrical about a central longitudinal axis thereof. Therefore the two A-pillar 12 are the same (except for being mirror images of one another); the two B-pillars 14 are the same (except for being mirror images of one another); the two C-pillars 16 are the same (except for being mirror images of one another); the two roof rail structures 18 are the same (except for being mirror images of one another); and, the two sill structures 22 are the same (except for being mirror images of one another). Therefore, only one side of the vehicle body structure 10 is described herein below for the sake of brevity.

As shown in FIG. 1, the A-pillar 12, the B-pillar 14, a forward section of the roof rail structure 18 and a forward section of the sill structure 22 together define a front door opening 26. Further, the B-pillar 14, the C-pillar 16, a rearward section of the roof rail structure 18 and a rearward section of the sill structure 22 together define a rear door opening 28.

The A-pillar 12 is constructed from several panels welded together in a conventional manner. As shown in FIG. 1, a lower end 12a of the A-pillar 12 is attached via, for example, welding techniques, to a forward end 22a of the sill structure 22. An upper end 12b of the A-pillar 12 is attached via, for example, welding techniques, to a forward end 18a of the roof rail structure 18. Since A-pillars are conventional structures, further description is omitted for the sake of brevity.

The B-pillar 14 is constructed from several panels welded together in a conventional manner. As shown in FIG. 1, a lower end 14a of the B-pillar 14 is attached via, for example, welding techniques, to a mid-section or B-pillar attachment section 30 of the sill structure 22. An upper end 14b of the B-pillar 14 is attached via, for example, welding techniques, to a mid-section 18b of the roof rail structure 18. Since B-pillars are conventional structures, further description is omitted for the sake of brevity.

Similarly, the C-pillar 16 is constructed from several panels welded together in a conventional manner. As shown in FIG. 1, a lower end 16a of the C-pillar 16 is attached via, for example, welding techniques, to a rear section 22b of the sill structure 22. An upper end 16b of the C-pillar 16 is attached via, for example, welding techniques, to a rearward end of the roof rail structure 18. Since B-pillars are conventional structures, further description is omitted for the sake of brevity.

The roof rail structure 18 is constructed from several panels welded together in a conventional manner. Since roof rail structure are conventional structures, further description is omitted for the sake of brevity.

A description of the floor structure 20 is provided further below, with reference to FIGS. 2 and 7-9. The floor structure 20 extends between the two sill structures 22 (driver's side and passenger's side) and from a forward area of the passenger compartment of the vehicle body structure 10 to the rearward area of the passenger compartment. The floor structure 20 includes a floor panel 32, a first cross member 34, a second cross member 36, a third cross member 38 and floor brackets 40 (only one reinforcement bracket 40 shown). The floor panel 32 extends between the two sill structures 22 (driver's side and passenger's side) and from the forward area of the passenger compartment of the vehicle body structure 10 to the rearward area of the passenger compartment. Each of the first cross member 34, the second cross member 36 and the third cross member 38 extend between the two sill structures 22 (driver's side and passenger's side). The first cross member 34 is located forward of the second cross member 36 and the third cross member 38. The third cross member 38 is located rearward of both the first cross member 34 and the second cross member 36, with the second cross member 36 being located between the first cross member 34, the third cross member 38. The first cross member 34, the second cross member 36 and the third cross member 38 are spaced apart from one another providing rigidity and strength to the floor structure 20 and the sill structure 22.

The first cross member 34, the second cross member 36 and the third cross member 38 are all welded to the floor panel 32 and are further welded to the sill structures 22 in a conventional manner. Each of the floor brackets 40 is welded to a corresponding end of the second cross-member 36 and to an inboard side of a corresponding one of the sill structures 22 at a location forward of the B-pillar attachment section 30.

In the following description, the word vertical is used herein to generally mean upright, and not necessarily plumb vertical. The word horizontal is used herein to mean generally reclined or recumbent, and not necessarily perpendicular to plumb vertical. Further, when two adjacent portions or section of elements described herein are characterized as being vertical and horizontal, the vertical portion and the horizontal portion can define an angle of 90 degrees therebetween, but can also define an angle therebetween that is less than 90 degrees or greater than 90 degrees. For example, adjacent horizontal portions or sections and vertical portions or sections can define angles therebetween that are any value between 80 degrees and 100 degrees, and, are not limited to being 90 degree perpendicular to one another.

Also, as used herein below, the term "Various welding techniques" can refer to the use of just one welding technique or combinations of welding techniques that can be used to rigidly and non-movably attach two differing metallic elements together. The various welding techniques can include, for example, spot welding, various types of arc welding, MIG welding, TIG welding, or any other appropriate welding technique appropriate for use in automotive construction where two metallic elements arc welded together.

Figure 2:
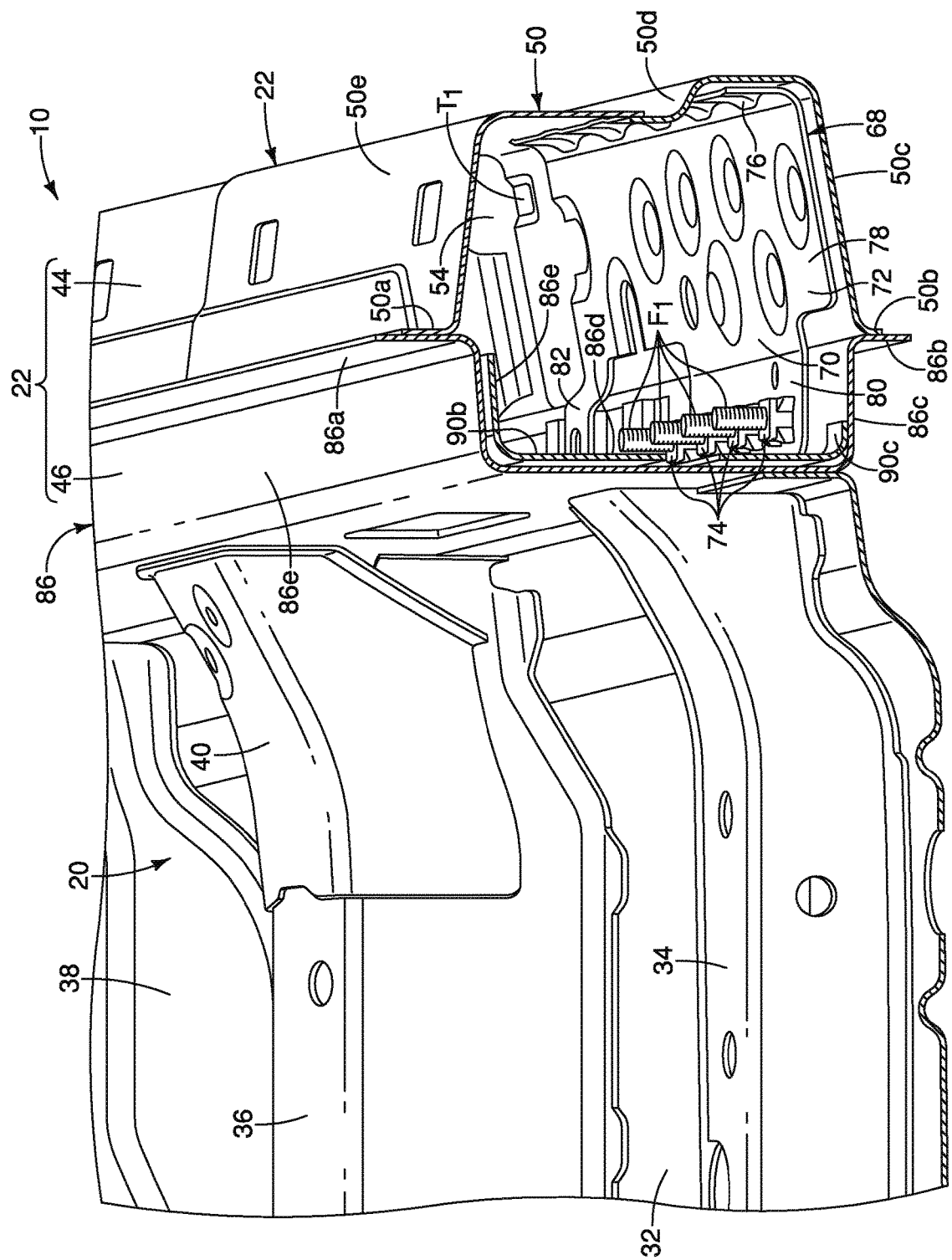
FIG. 2 is a perspective cross-sectional view of a portion of the vehicle body-structure taken along the line 2-2 in FIG. 1, showing a floor structure along with elements of an outer sill assembly and an inner sill assembly that define the sill structure in accordance with the first embodiment.
Figure 3:
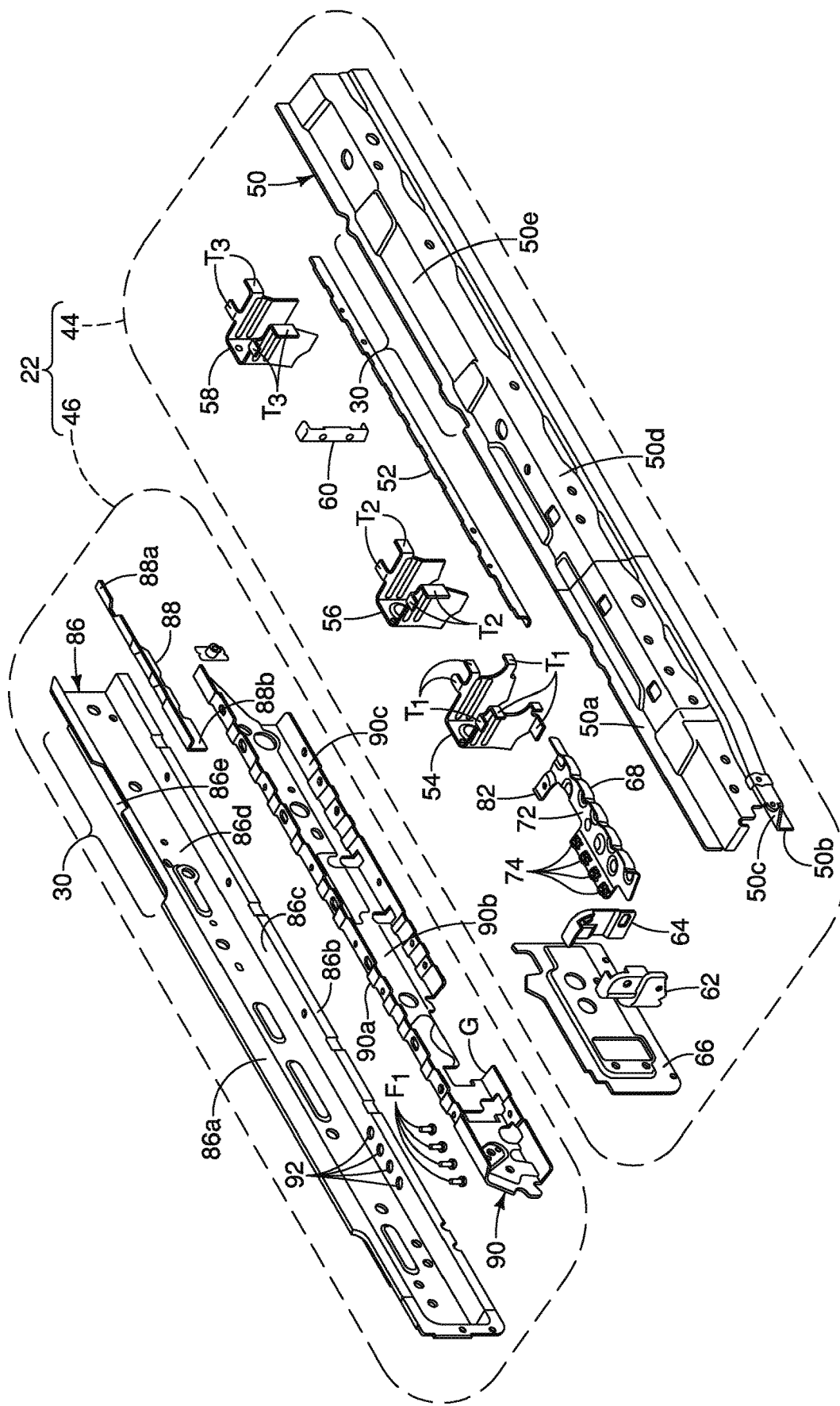
FIG. 3 is an exploded view of the sill structure removed from the vehicle body structure showing various elements of the outer sill assembly including a first reinforcement bracket and various elements of the inner sill assembly including a second reinforcement bracket in accordance with the first embodiment.

A description of the sill structure 22 is now provided with specific reference to FIGS. 1-9. As shown in FIG. 3, the sill structure 22 includes an outer sill assembly 44 and an inner sill assembly 46.

The outer sill assembly 44 includes an outer sill member 50, an elongated member 52, a first bulkhead 54, a second bulkhead 56, a third bulkhead 58, a bracket 60, a forward brackets 62 and 64, a forward panel 66 and a first reinforcement bracket 68.

As shown in FIGS. 2-3 and 6-9, the outer sill member 50 is an elongated member that includes multiple shaped sections, each having its own orientation, but with all sections being elongated in a vehicle lengthwise direction DL. The outer sill member 50 can be formed from a single sheet of metal or can be assembled from a plurality of plates or sheets of metallic material that are welded together to form the depicted outer sill member 50.

The outer sill member 50 has an outer upper flange 50a, an outer lower flange 50b, a lower horizontally extending section 50c, an upright extending section 50d and an upper horizontally extending section 50e. The outer upper flange 50a and the outer lower flange 50b both have an upright or vertical orientation and extend the entire length of the outer sill member 50. The lower horizontally extending section 50c, the upright extending section 50d and the upper horizontally extending section 50e define a C-shape in cross-section, as shown in FIG. 2.

The lower horizontally extending section 50c, the upright extending section 50d and the upper horizontally extending section 50e define part of a hollow area 70 within the C-shape thereof. More specifically, the hollow area 70 is more completely defined when the outer sill assembly 44 and the inner sill assembly 46 are welded together, as described further herein below.

The upper horizontally extending section 50e extends from and along an upper end of the upright extending section 50d. The lower horizontally extending section 50c extends from and along a lower end of the upright extending section 50d. The outer upper flange 50a extends upward from and along an inboard end of the upper horizontally extending section 50e. The outer lower flange 50b extends downward from and along an inboard end of the lower horizontally extending section 50c. The outer sill member 50 is formed as a single, unitary, monolithic metal element. Preferably, each element of the sill structure 22 is made of metal, such as steel, alloy, or other metallic material.

Figure 6:
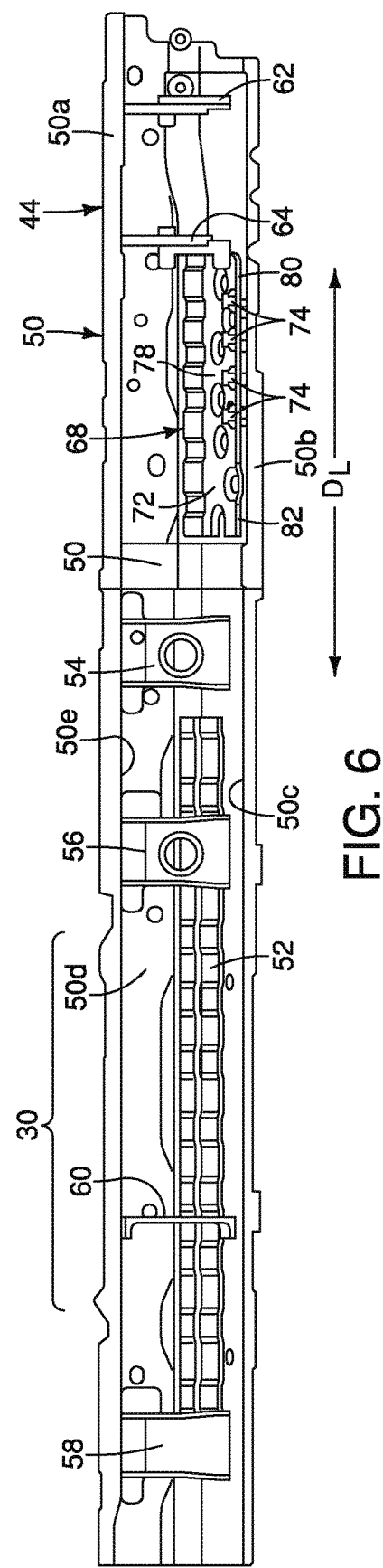
FIG. 6 is a side view of an inboard side of the outer sill assembly separated from the sill structure showing the various elements thereof including the first reinforcement bracket in accordance with the first embodiment.
Figure 7:
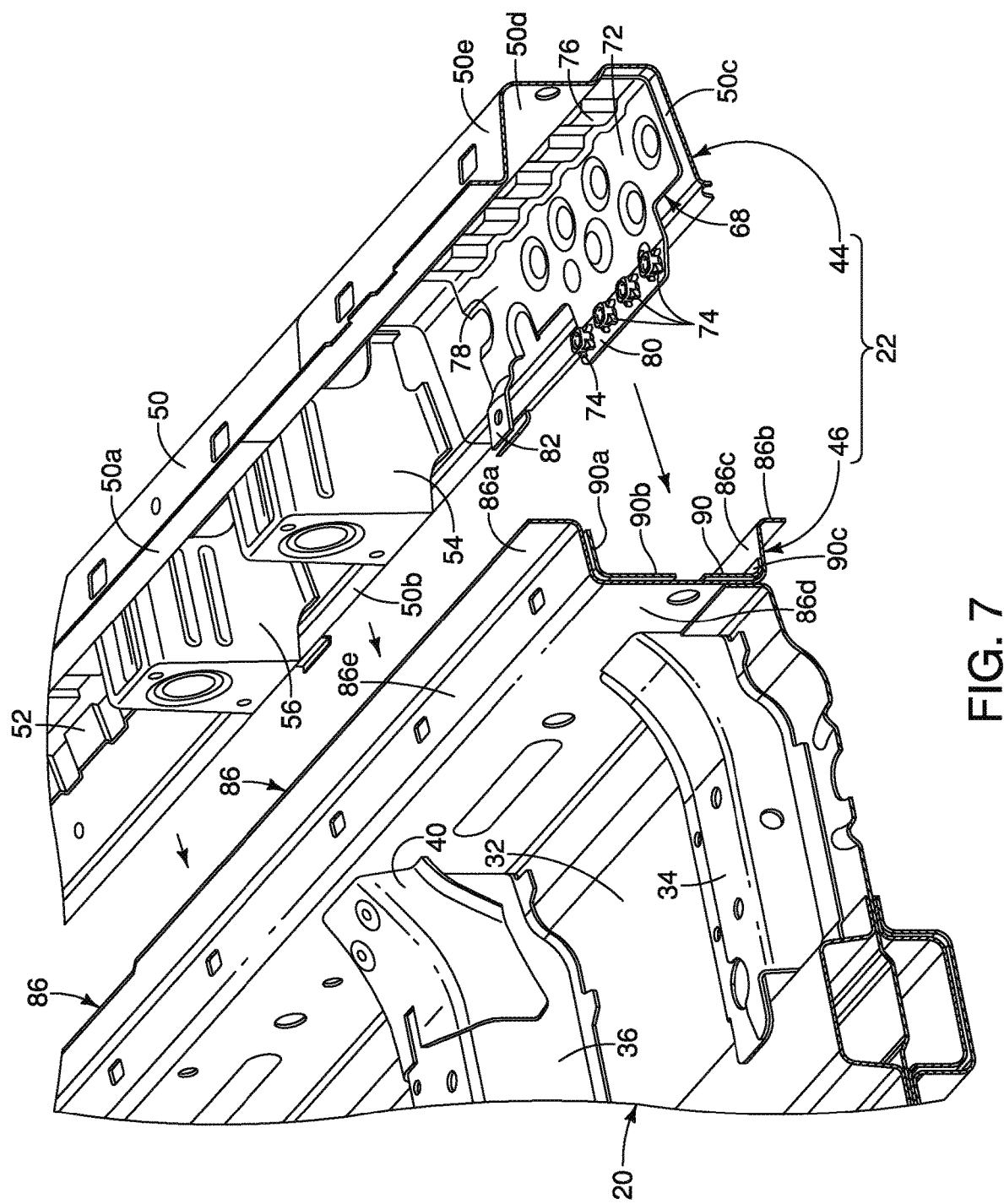
FIG. 7 is a first perspective exploded view of the sill structure showing the floor structure attached to the inner sill assembly and details of the inboard side of the outer sill assembly in accordance with the first embodiment.

The elongated member 52 is has an L-shape when viewed from either end thereof and is welded to both the upright extending section 50d and the lower horizontally extending section 50c along its entire length, as shown in FIGS. 6 and 7.

The first bulkhead 54, the second bulkhead 56 and the third bulkhead 58 are each welded to different areas of the outer sill assembly 44, as indicated in FIG. 3. Each of the first bulkhead 54, the second bulkhead 56 and the third bulkhead 58 extends into that portion of the outer sill member 50 that defines the hollow area 70. Further, each of the first bulkhead 54, the second bulkhead 56 and the third bulkhead 58 includes tabs $T_1$, $T_2$ and $T_3$, respectively, or flanges that define attachment locations for welds between the first bulkhead 54, the second bulkhead 56 and the third bulkhead 58 and corresponding surface portions of upper horizontally extending section 50e extends from and along an upper end of the upright extending section 50d.

Figure 8:
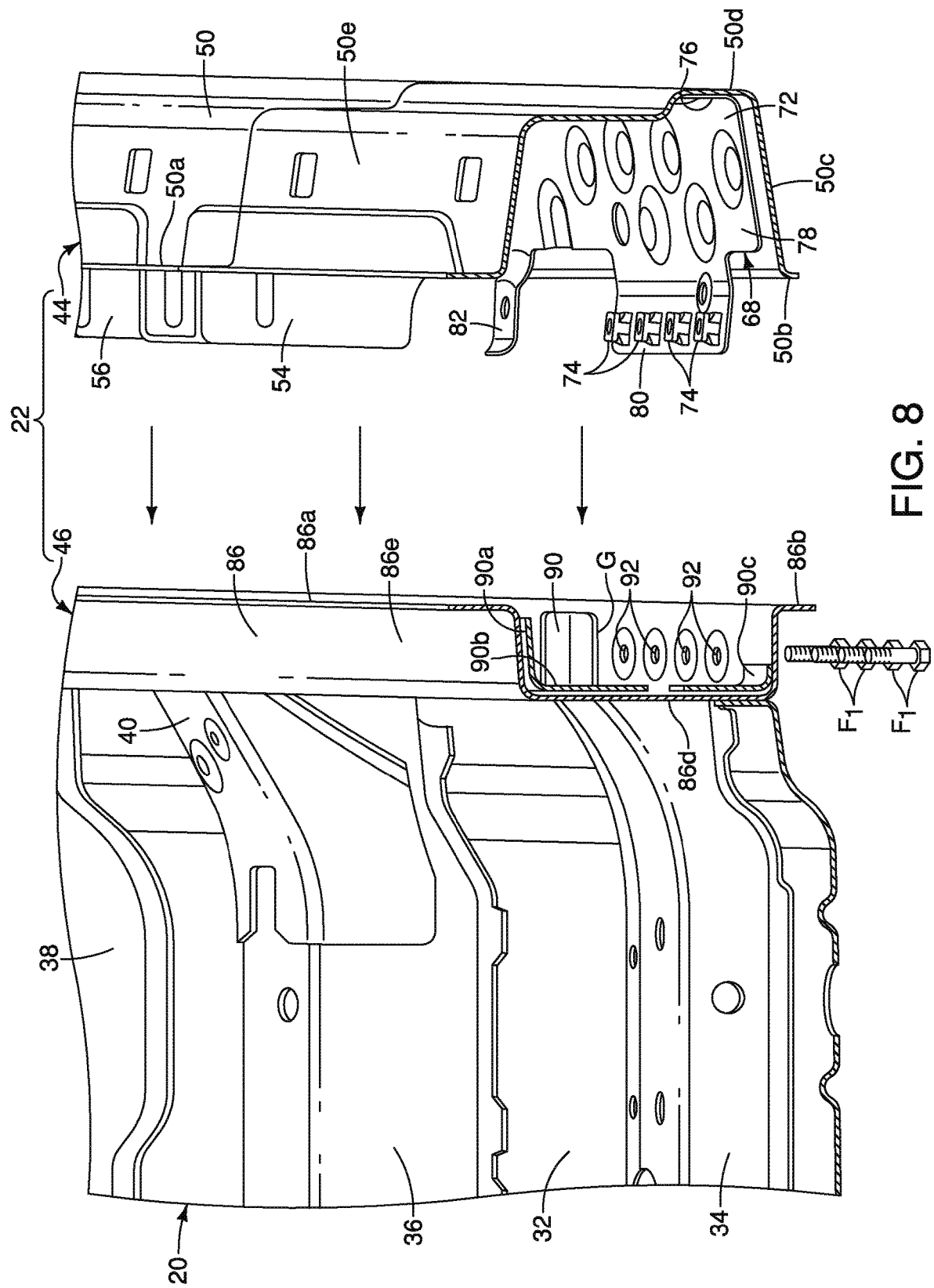
FIG. 8 is a second perspective exploded view of the sill structure showing the floor structure attached to the inner sill assembly and details of the outer sill assembly in accordance with the first embodiment.

The first bulkhead 54 is welded to the outer sill member 50 at a locations close to a central section of the front door opening 26. Further, the first bulkhead 54 is aligned with the first cross member 34 and its corresponding floor bracket 40, as shown in FIGS. 7 and 8. The second bulkhead 56 is located forward of and proximate the B-pillar attachment section 30. The third bulkhead 58 is located rearward of and proximate the B-pillar attachment section 30.

The bracket 60 is welded to each of the lower horizontally extending section 50c, the upright extending section 50d and the upper horizontally extending section 50e within the B-pillar attachment section 30. The forward brackets 62 and 64 are also welded to each of the lower horizontally extending section 50c, the upright extending section 50d and the upper horizontally extending section 50e forward of the B-pillar attachment section 30 and proximate the forward end 22a of the sill structure 22.

The forward panel 66 extends from the outer upper flange 50a to the outer lower flange 50b and is welded to each of the outer upper flange 50a to the outer lower flange 50b such that the forward panel 66 is sandwiched between the outer sill member 50 and the inner sill member 52.

A description of the first reinforcement bracket 68 is now provided with initial reference to FIGS. 2-4 and 6. The first reinforcement bracket 68 basically includes a contoured plate 72 and a plurality of fastener members 74.

The contoured plate 72 is formed as a single, unitary, monolithic metal element. More specifically, the contoured plate 72 can be formed from a single piece of sheet metal that is bent, molded and/or otherwise formed into the shape depicted in FIG. 4. More specifically, the contoured plate 74 shaped to include an upright flange portion 76, a first horizontally oriented portion 78, a second horizontally oriented portion 80 and an alignment flange 82. The first reinforcement bracket 68 is located rearward of the A-pillar 12 and forward of the B-pillar 14, and forward of the B-pillar attachment section 30.

The upright flange portion 76 is an elongated flange that includes corrugated surface sections such that alternating surface portions thereof contact and mate with the upright extending section 50d of the outer sill member 50. The contacting surface portions of the upright flange portion 76 arc welded to the upright extending section 50d of the outer sill member 50.

The first horizontally oriented portion 78 (an outboard portion) and the second horizontally oriented portion 80 (inboard portion) are not co-planar but rather are angularly offset from one another defining an angle of between 150 degrees and 175 degrees. In other words, the first horizontally oriented portion 78 and the second horizontally oriented portion 80, once installed within the hollow area 70 of the sill structure 22, are not perfectly horizontal. Rather, the first horizontally oriented portion 78 and the second horizontally oriented portion 80 are approximately horizontal and are each angularly offset from true horizontal by an angle that is between 5 and 15 degrees, depending upon the overall design and shape of the sill structure 22. In the depicted embodiment, each of the first horizontally oriented portion 78 and the second horizontally oriented portion 80 is offset from true horizontal by between 5 and 7.5 degrees and offset from one another by between 165 and 170 degrees.

The first horizontally oriented portion 78 is oriented and shaped to overlay a portion of the lower horizontally extending section 50c and is further welded thereto. The second horizontally oriented portion 80 is oriented and shaped to attach to the inner sill assembly 46 in a manner that is described further below.

Figure 4:
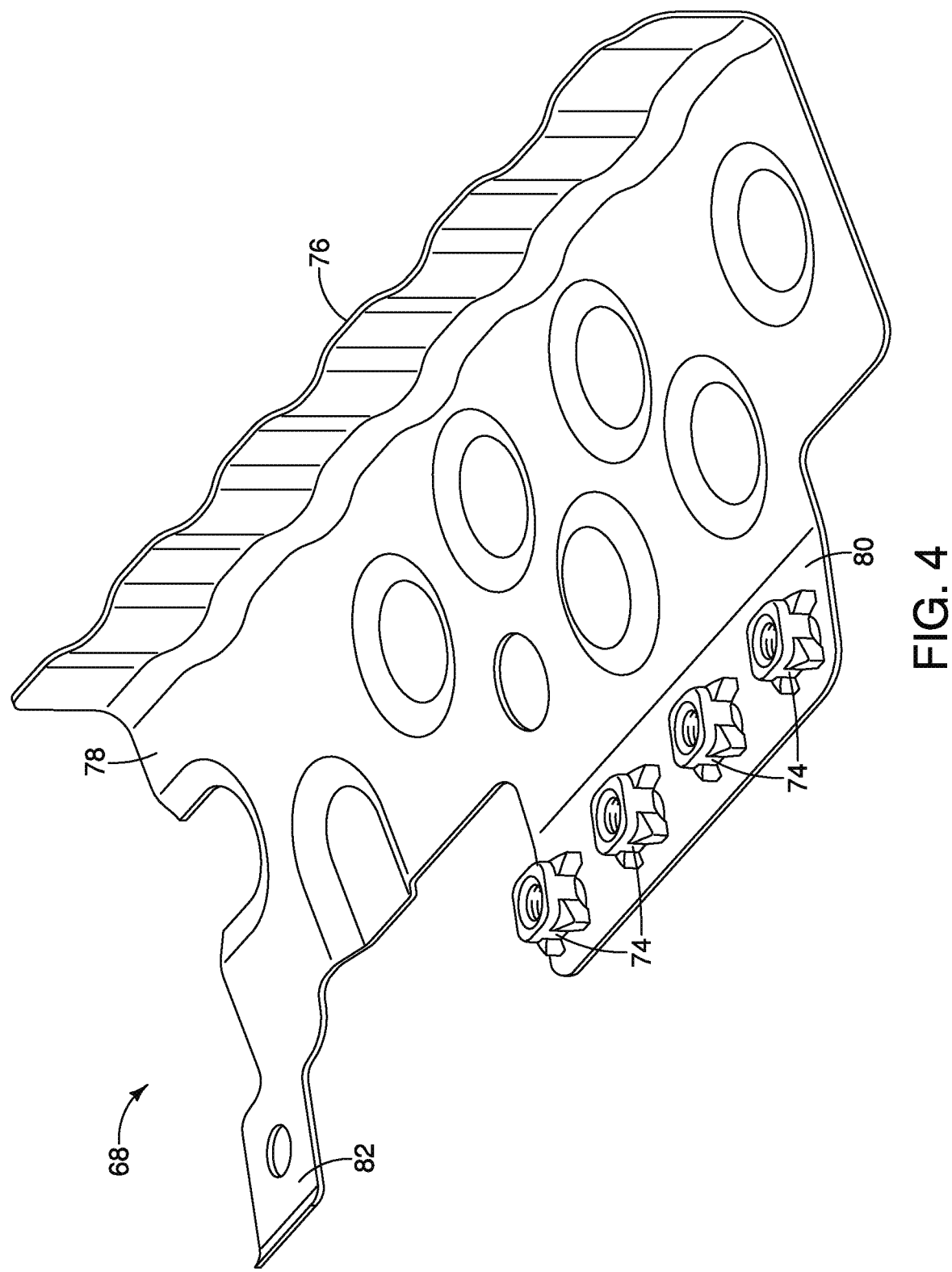
FIG. 4 is a perspective view of the first reinforcement bracket shown removed from the outer sill assembly in accordance with the first embodiment.
Figure 9:
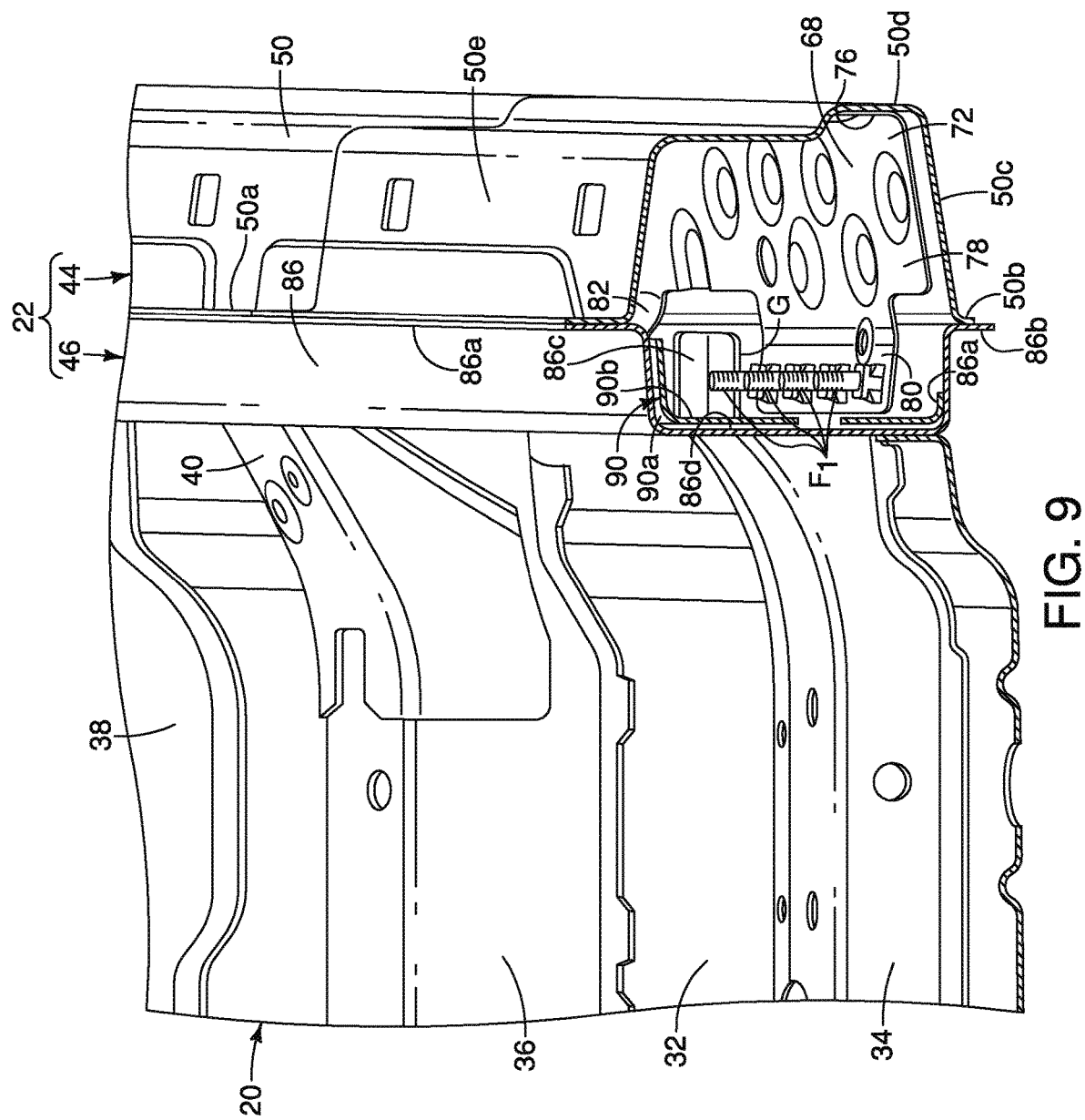
FIG. 9 is a third perspective view of the sill structure similar to FIG. 8 showing the floor structure attached to the inner sill assembly and the outer sill assembly attached to the inner sill assembly in accordance with the first embodiment.

The second horizontally oriented portion 80 (also referred to as an inboard portion of the first reinforcement bracket 68) and the alignment flange 82 (also referred to herein below as an alignment projection) are co-planar and both extend in an inboard direction from the first horizontally oriented portion 78, as shown in FIG. 4. The fastener members 74 are welded to the second horizontally oriented portion 80 at spaced apart locations thereon. In the depicted embodiment, the fastener members 74 are threaded nuts that subsequently receive fasteners $F_1$ as shown in FIGS. 8 and 9. Further descriptions of the alignment flange 82 and the second horizontally oriented portion 80 are provided below following a description of the inner sill assembly 46.

Figure 5:
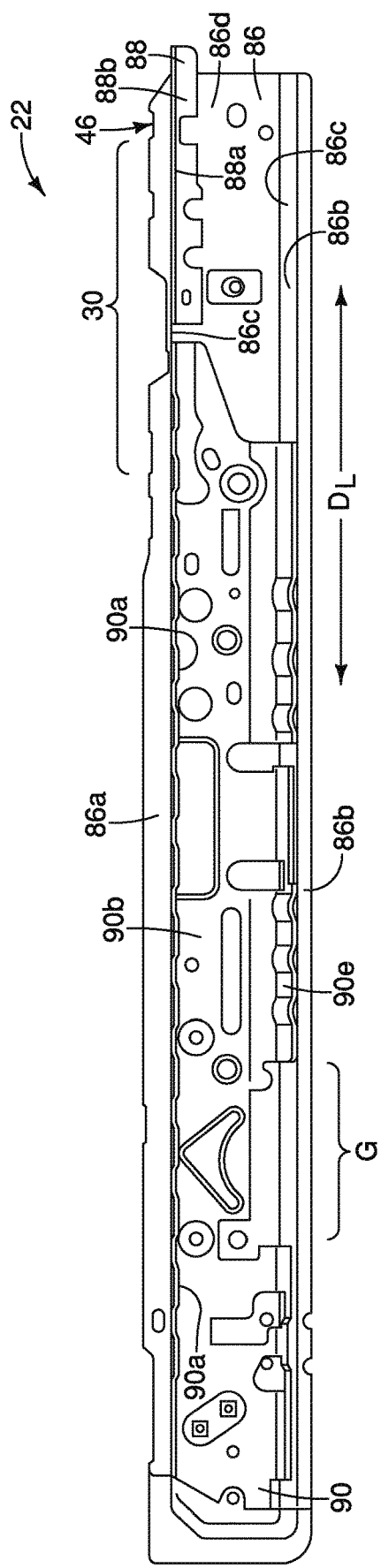
FIG. 5 is a side view of an outboard side of the inner sill assembly separated from the sill structure showing the various elements thereof including the second reinforcement bracket in accordance with the first embodiment.

A description of the inner sill assembly 46 is now provided initially with reference to FIGS. 2, 3 and 5.

As shown in FIG. 3, the inner sill assembly 46 includes an inner sill member 86, an elongated member 88 and a second reinforcement bracket 90. The inner sill member 86 includes an inner upper flange 86a, an inner lower flange 86b, a lower horizontally extending section 86c, an upright extending section 86d and an upper horizontally extending section 86e. The lower horizontally extending section 86c, the upright extending section 86d and the upper horizontally extending section 86e have a C-shape as viewed in cross-section and together with the lower horizontally extending section 50c, the upright extending section 50d and the upper horizontally extending section 50e of the outer sill member 50 define the hollow area 70. The lower horizontally extending section 86c includes a plurality of openings 92 that are spaced apart from one another.

The inner upper flange 86a of the inner sill member 86 extends upward from the upper horizontally extending section 86e. The inner lower flange 86b extends downward from the lower horizontally extending section 86c. Similar to the outer sill member 50, the inner sill member 86 can be made as a single elongated metallic member or can be assembled from a plurality of separate plates that are welded together to define the inner sill member 86.

The inner upper flange 86a and the outer upper flange 50a are fixedly attached to one another, via, for example, welding techniques. The inner lower flange 86b and the outer lower flange 50b are fixedly attached to one another via, for example, welding techniques, thereby defining the sill structure 22 with hollow interior 70 being defined between the outer sill assembly 44 and the inner sill assembly 46.

The elongated member 88 is an elongated bracket that has an upper flange 88a and a lower flange 88b that are approximately perpendicular (angularly offset from one another by an angle of 90 degrees or more). The upper flange 88a is welded at various locations along its length to the upper horizontally extending section 86e. The lower flange 88b is welded at various locations along its length to the upright extending section 86d.

As shown in FIGS. 3 and 5, the second reinforcement bracket 90 has an upper horizontally extending flange 90a, an upright extending section 90b and a lower horizontally extending flange 90c. The upper horizontally extending flange 90a, the upright extending section 90b and the lower horizontally extending flange 90c define a C-shape in cross-section, as shown in FIGS. 2 and 7-9. The upper horizontally extending flange 90a is attached at various locations along its length to the upper horizontally-extending section 86e of the inner sill member 86 via welding techniques. The lower horizontally extending flange 90c is attached at various locations along its length to the lower horizontally extending section 86c of the inner sill member 86 via welding techniques. As shown in FIGS. 2, 7, 8 and 9 in the first embodiment, the upright extending section 90b of the second reinforcement bracket 90 is spaced apart from the upright extending section 86d of the inner sill member 86. Optionally, in an alternative embodiment, the upright extending section 90b of the second reinforcement bracket 90 can be attached to the upright extending section 86d of the inner sill member 86 at various locations along its length.

The lower horizontally extending flange 90c of the second reinforcement bracket 90 defines a gap G dimensioned to receive the inboard portion 80 (the second horizontally oriented portion 80) of the first reinforcement member 68 such that the lower horizontally extending flange and the inboard portion of the first reinforcement member 68 are spaced apart from one another within the gap. The lower horizontally extending flange 90c of the second reinforcement bracket 90 is dimensioned and shaped such that the gap G exposes the plurality of openings 92 defined in the lower horizontally extending section 86c of the inner sill member 86, as shown in FIGS. 3 and 8.

One manufacturing process for constructing the vehicle body structure 10 includes first assembling and welding together the above described parts of the outer sill assembly 44. Similarly, the manufacturing process includes assembling and welding together the above described parts of the inner sill assembly 46.

As shown in FIGS. 7-9, during the manufacturing process, the outer sill assembly 44 (fully assembled) and the inner sill assembly 46 (fully assembled) are aligned and moved toward one another such that the following relationships are achieved. First, the alignment flange 82 is guided into that portion of the hollow area 70 defined by the inner sill assembly 46. More specifically, the alignment flange 82 is dimensioned and positioned to contact a portion of the second reinforcement bracket 90 to assist in aligning the outer sill assembly 44 and the inner sill assembly 46 together. The outer upper flange 50a of the outer sill member 50 and the inner upper flange 86a of the inner sill member 86 then brought into contact with one another and mate with one another. At about the same time, the outer lower flange 50b of the outer sill member 50 and the inner lower flange 86b of the inner sill member 86 contact and mate with one another. Further, the second horizontally oriented portion 80 of the first reinforcement bracket 68 of the outer sill assembly 44, now located within the hollow interior 70, is fitted into the space defined by the gap G of the lower horizontally extending flange 90c of the second reinforcement bracket 90 of the inner sill assembly 46.

The openings 92 in the lower horizontally extending section 86c and the fastener members 74 of the second horizontally oriented portion 80 of the first reinforcement bracket 68 align such that fasteners Ft are inserted through corresponding ones of the openings 92 and threaded into corresponding ones of the fastener members 74 of the first reinforcement bracket 68.

At about the same time the fasteners $F_1$ are installed, the outer upper flange 50a of the outer sill member 50 and the inner upper flange 86a of the inner sill member 86 are welded to one another. Similarly, the outer lower flange 50b of the outer sill member 50 and the inner lower flange 86b of the inner sill member 86 are welded to one another to produce the fully assembled sill structure 22. Thereafter, the sill structure 22 is attached to (for example, welding techniques) the A-pillar 12, the B-pillar 14, the C-pillar 16 and the floor structure 20 thereby at least partially defining the vehicle body structure 10. As shown in FIG. 1, the lower end 14a of the B-pillar 14 is attached to the sill structure 22 at the B-pillar attachment section 30. The B-pillar 14 is attached to both the outer sill member 50 of the outer sill assembly 44 and the inner sill member 46 of the inner sill assembly 46 via welding techniques.

As shown in FIGS. 2, 7, 8 and 9 in the first embodiment, the second horizontally oriented portion 80 of the first reinforcement bracket 68 has a non-contacting relationship with the second reinforcement bracket 90 with the sill structure 22 fully assembled.

One of the benefits of the inclusion of the first reinforcement bracket 68 in the sill structure 22 is the connection between the lower horizontally extending section 50c of the outer sill member 50 and the lower horizontally extending section 86c of the inner sill member 86 at a location forward of the B-pillar 14 and the B-pillar attachment section 30, and, adjacent to (and rearward of) the A-pillar 12. This connection provides added strength to the sill structure 22. The connection established by the first reinforcement bracket 68 between the outer sill assembly 44 and the inner sill assembly 46 along with the second reinforcement bracket 90 within the inner sill assembly 46 further adds strength and rigidity to resist rotation of the sill structure proximate the A-pillar 12 in response an impact event where impact force is applied to the B-pillar 14.

Figure 10:
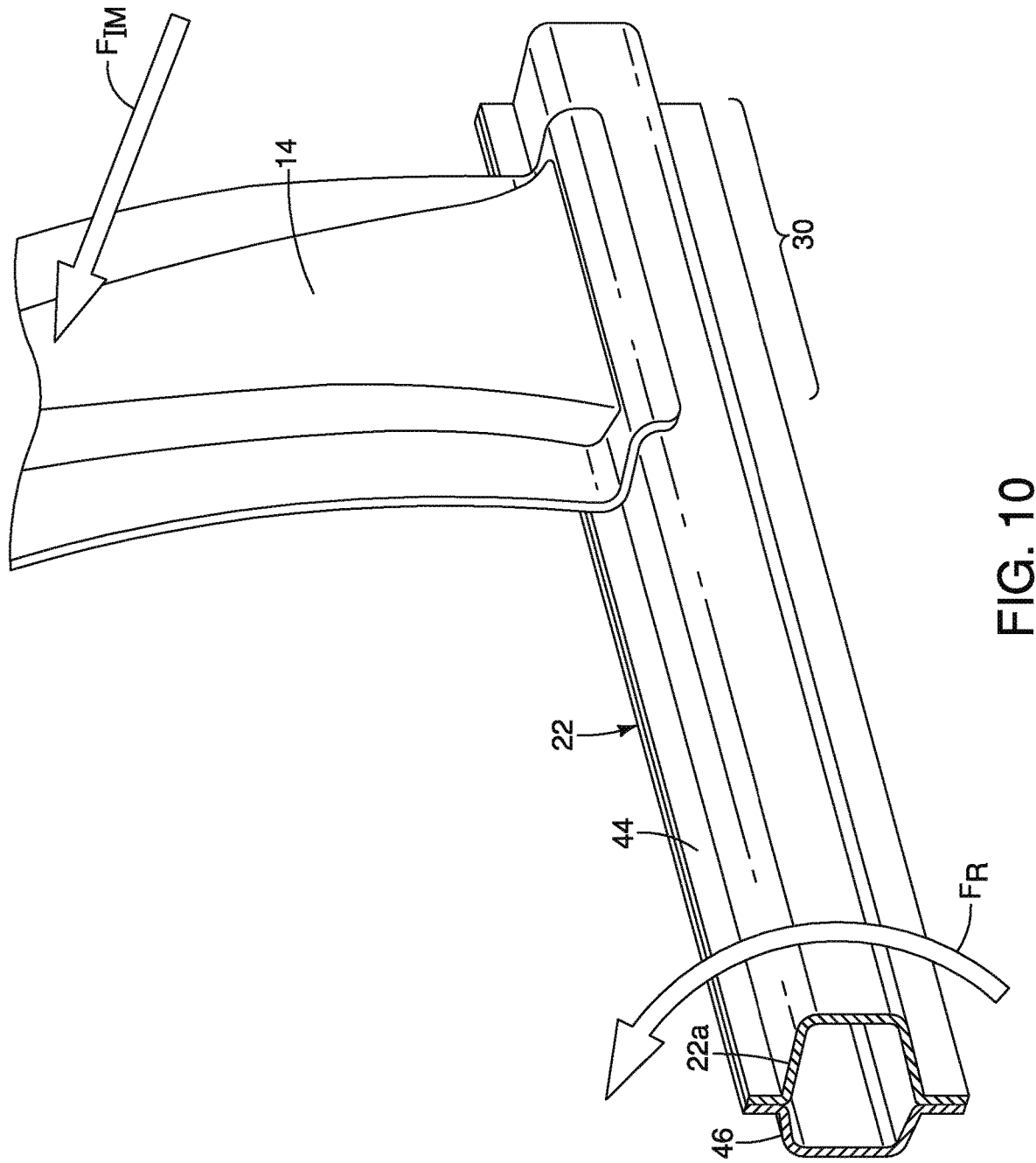
FIG. 10 is a schematic view of a portion of the sill structure and the B-pillar attached to one another showing an impact force being applied to a central area of the B-pillar above the sill structure and showing resulting rotational forces being transmitted through the B-pillar to a forward section of the sill structure accordance with the first embodiment.

FIG. 10 is a schematic perspective view showing the sill structure 22 and B-pillar 14 with other portions of the vehicle body structure 10 removed for clarity. As shown in FIG. 10, when an impacting force $F_{IM}$ acts on a central area of the B-pillar 14, the B-pillar 14 can deform (not shown) and apply a lever-like rotating force $F_R$ on the sill structure 22. The first reinforcement bracket 68 and the second reinforcement bracket 90 create a more rigid and rotation resistant sill structure 22 as compared to a sill structure without the first reinforcement bracket 68 and the second reinforcement bracket 90.

Second Embodiment

Referring now to FIGS. 11-19, a vehicle body structure 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle body structure 110 includes numerous panels that when assembled define a plurality of structures, including, an A-pillar 112, a B-pillar 114, a C-pillar 116, a roof rail structure 118, a floor structure 120 (FIGS. 12 and 17-19) and a sill structure 122.

It should be understood from the drawings and the description hereinbelow that there are two A-pillar 112, two B-pillars 114, two C-pillars 116, two roof rail structures 118 and two sill structures 122, one of each on each of the two sides of the vehicle body structure 110. Since the vehicle body structure 110 is generally symmetrical about a central longitudinal axis thereof. Therefore the two A-pillar 112 are the same (except for being mirror images of one another); the two B-pillars 114 are the same (except for being mirror images of one another); the two C-pillars 116 are the same (except for being mirror images of one another); the two roof rail structures 118 are the same (except for being mirror images of one another); and, the two sill structures 122 are the same (except for being mirror images of one another). Therefore, only one side of the vehicle body structure 110 is described herein below for the sake of brevity.

Figure 11:
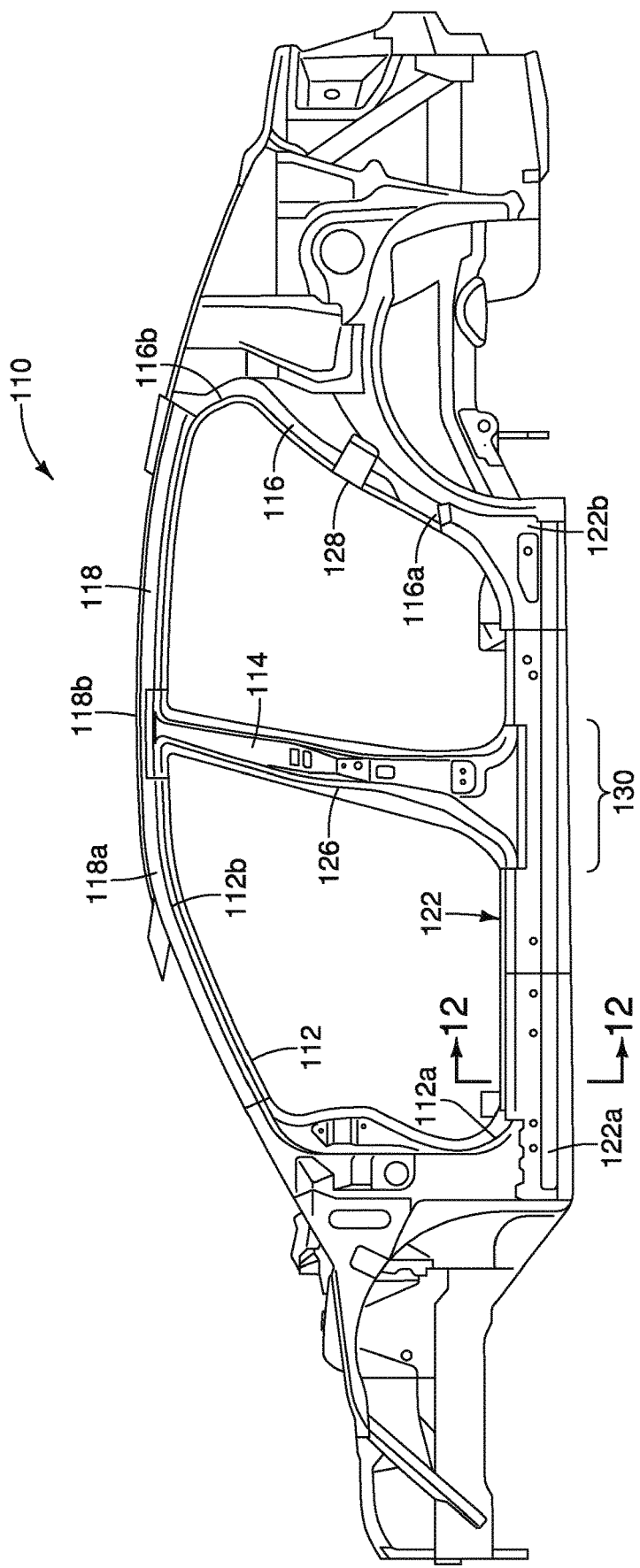
FIG. 11 is a side view of a vehicle body structure of an automotive vehicle that includes an A-pillar, a B-pillar, a C-pillar and a sill structure in accordance with a second embodiment.

As shown in FIG. 11, the A-pillar 112 the B-pillar 114, a forward section of the roof rail structure 118 and a forward section of the sill structure 122 together define a front door opening 126. Further, the B-pillar 114, the C-pillar 116, a rearward section of the roof rail structure 118 and a rearward section of the sill structure 122 together define a rear door opening 128.

The A-pillar 112 is constructed from several panels welded together in a conventional manner. As shown in FIG. 11, a lower end 112a of the A-pillar 112 is attached via, for example, welding techniques, to a forward end 122a of the sill structure 122. An upper end 112b of the A-pillar 112 is attached via, for example, welding techniques, to a forward end 118a of the roof rail structure 118. Since A-pillars are conventional structures, further description is omitted for the sake of brevity.

The B-pillar 114 is constructed from several panels welded together in a conventional manner. As shown in FIG. 11, a lower end 114a of the B-pillar 114 is attached via, for example, welding techniques, to a mid-section or B-pillar attachment section 130 of the sill structure 122. An upper end 114b of the B-pillar 114 is attached via, for example, welding techniques, to a mid-section 118b of the roof rail structure 118. Since B-pillars are conventional structures, further description is omitted for the sake of brevity.

Similarly, the C-pillar 116 is constructed from several panels welded together in a conventional manner. As shown in FIG. 11, a lower end 116a of the C-pillar 116 is attached via, for example, welding techniques, to a rear section 122b of the sill structure 122. An upper end 116b of the C-pillar 116 is attached via, for example, welding techniques, to a rearward end of the roof rail structure 118. Since B-pillars are conventional structures, further description is omitted for the sake of brevity.

The roof rail structure 118 is constructed from several panels welded together in a conventional manner. Since roof rail structure are conventional structures, further description is omitted for the sake of brevity.

A description of the floor structure 120 is provided further below, with reference to FIGS. 12 and 17-19. The floor structure 120 extends between the two sill structures 122 (driver's side and passenger's side) and from a forward area of the passenger compartment of the vehicle body structure 110 to the rearward area of the passenger compartment. The floor structure 120 includes a floor panel 132, a first cross member 134, a second cross member 136, a third cross member 138 and floor brackets 140 (only one reinforcement bracket 140 shown). The floor panel 132 extends between the two sill structures 122 (driver's side and passenger's side) and from the forward area of the passenger compartment of the vehicle body structure 110 to the rearward area of the passenger compartment. Each of tire first cross member 134, the second cross member 136 and the third cross member 138 extend between the two sill structures 122 (driver's side and passenger's side). The first cross member 134 is located forward of the second cross member 136 and the third cross member 138. The third cross member 138 is located rearward of both the first cross member 134 and the second cross member 136, with the second cross member 136 being located between the first cross member 134, the third cross member 138. The first cross member 134, the second cross member 136 and the third cross member 138 are spaced apart from one another providing rigidity and strength to the floor structure 120 and the sill structure 122.

The first cross member 134, the second cross member 136 and the third cross member 138 are all welded to the floor panel 132 and are further welded to the sill structures 122 in a conventional manner. Each of the floor brackets 140 is welded to a corresponding end of the second cross-member 136 and to an inboard side of a corresponding one of the sill structures 122 at a location forward of the B-pillar attachment section 130.

In the following description, the word vertical is used herein to generally mean upright, and not necessarily plumb vertical. The word horizontal is used herein to mean generally reclined or recumbent, and not necessarily perpendicular to plumb vertical. Further, when two adjacent portions or section of elements described herein are characterized as being vertical and horizontal, the vertical portion and the horizontal portion can define an angle of 190 degrees therebetween, but can also define an angle therebetween that is less than 190 degrees or greater than 190 degrees. For example, adjacent horizontal portions or sections and vertical portions or sections can define angles therebetween that are any value between 180 degrees and 1100 degrees, and, are not limited to being 190 degree perpendicular to one another.

Also, as used herein below, the term "various welding techniques" can refer to the use of just one welding technique or combinations of welding techniques that can be used to rigidly and non-movably attach two differing metallic elements together. The various welding techniques can include, for example, spot welding, various types of arc welding, MIG welding, TIG welding, or any other appropriate welding technique appropriate for use in automotive construction where two metallic elements are welded together.

Figure 12:
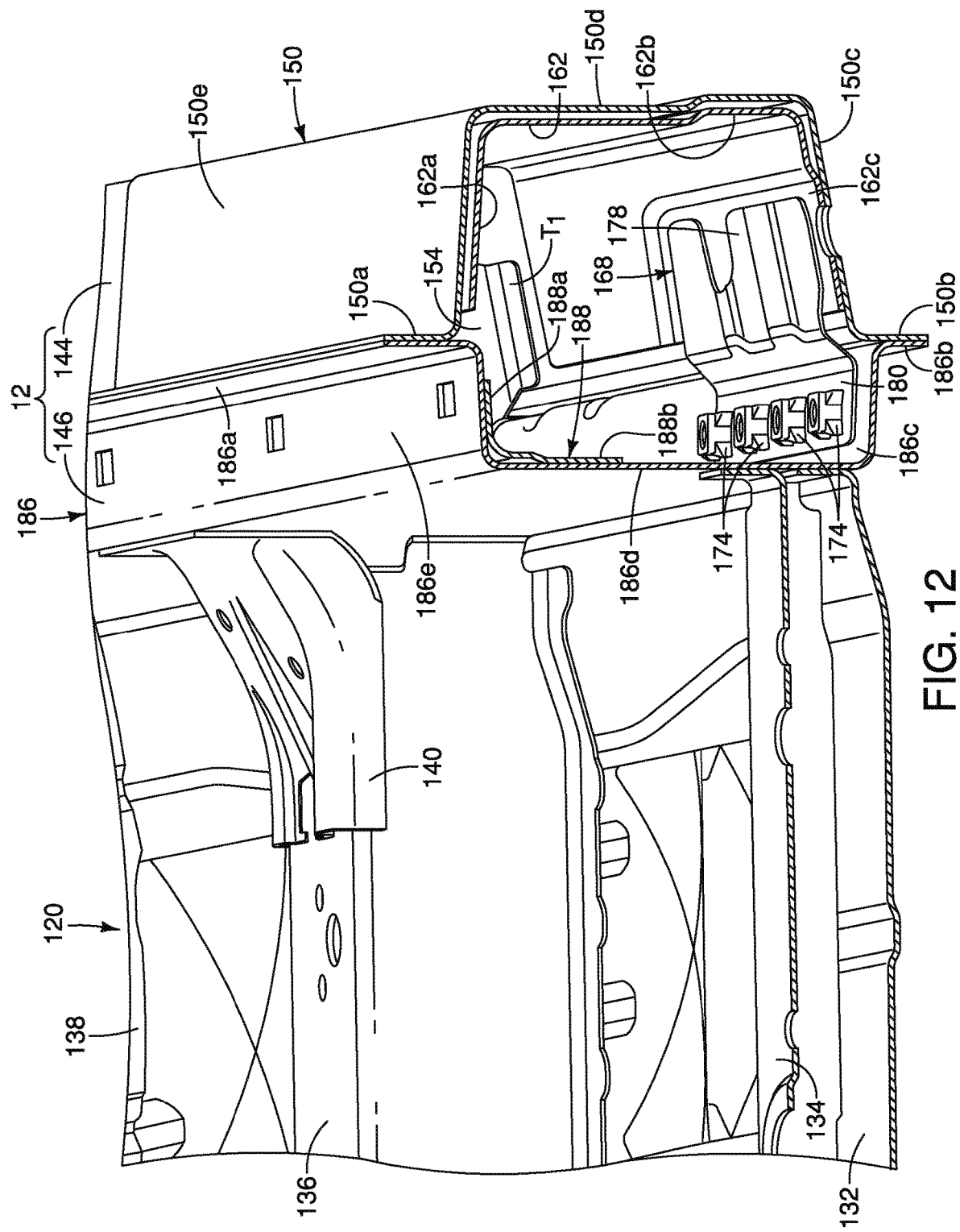
FIG. 12 is a perspective cross-sectional view of a portion of the vehicle body structure taken along the line 12-12 in FIG. 11, showing a floor structure along with elements of an outer sill assembly and an inner sill assembly that define the sill structure in accordance with the second embodiment.
Figure 13:
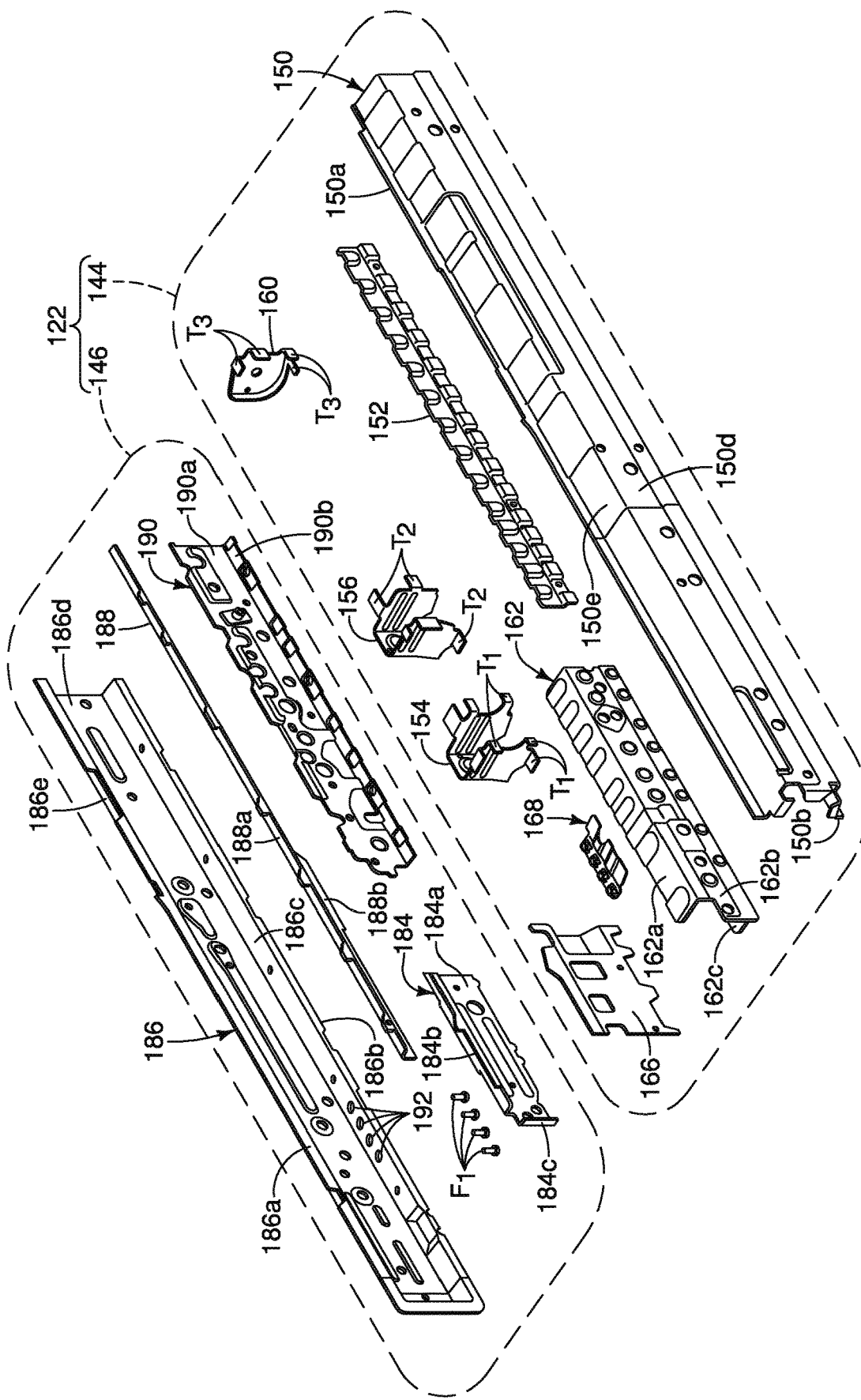
FIG. 13 is an exploded view of the sill structure removed from the vehicle body structure showing various elements of the outer sill assembly including a first reinforcement bracket and various elements of the inner sill assembly including a second reinforcement bracket in accordance with the second embodiment.

A description of the sill structure 122 is now provided with specific reference to FIGS. 11-19. As shown in FIG. 13, the sill structure 122 includes an outer sill assembly 144 and an inner sill assembly 146.

The outer sill assembly 144 includes an outer sill member 150, an elongated member 152, a first bulkhead 154, a second bulkhead 156, a bracket 160, a forward member 162, a forward panel 166 and a first reinforcement bracket 168.

As shown in FIGS. 12-13 and 16-19, the outer sill member 150 is an elongated member that includes multiple shaped sections, each having its own orientation, but with all sections being elongated in a vehicle lengthwise direction DL. The outer sill member 150 can be formed from a single sheet of metal or can be assembled from a plurality of plates or sheets of metallic material that are welded together to form the depicted outer sill member 150.

The outer sill member 150 has an outer upper flange 150a, an outer lower flange 150b, a lower horizontally extending section 150c, an upright extending section 150d and an upper horizontally extending section 150e. The outer upper flange 150a and the outer lower flange 150b both have an upright or vertical orientation and extend substantially the entire length of the outer sill member 150. The lower horizontally extending section 150c, the upright extending section 150d and the upper horizontally extending section 150c define a C-shape in cross-section, as shown in FIG. 12.

The lower horizontally extending section 150c, the upright extending section 150d and the upper horizontally extending section 150e define part of a hollow area 170 within the C-shape thereof. More specifically, the hollow area 170 is more completely defined when the outer sill assembly 144 and the inner sill assembly 146 are welded together, as described further herein below.

The upper horizontally extending section 150e extends from and along an upper end of the upright extending section 150d. The lower horizontally extending section 150c extends from and along a lower end of the upright extending section 150d. The outer upper flange 150a extends upward from and along an inboard end of the upper horizontally extending section 150e. The outer lower flange 150b extends downward from and along an inboard end of the lower horizontally extending section 150c. The outer sill member 150 is formed as a single, unitary, monolithic metal element. Preferably, each element of the sill structure 122 is made of metal, such as steel, alloy, or other metallic material.

The elongated member 152 is a flat panel that includes undulating sections that are welded to spaced apart locations along the upright extending section 150d, as shown in FIG. 16.

The first bulkhead 154, the second bulkhead 156 and the bracket 160 are each welded to different areas of the outer sill assembly 144, as indicated in FIG. 13. Each of the first bulkhead 154, the second bulkhead 156 and the bracket 160 extends into that portion of the outer sill member 150 that defines the hollow area 170. Further, each of the first bulkhead 154, the second bulkhead 156 and the bracket 160 includes tabs $T_1$, $T_2$ and $T_3$, respectively, or flanges that define attachment locations for welds between the first bulkhead 154, the second bulkhead 156 and the bracket 160 and corresponding surface portions of upper horizontally extending section 150e extends from and along an upper end of the upright extending section 150d.

The first bulkhead 154 is welded to the outer sill member 150 at a locations close to a central section of the front door opening 126. Further, the second cross member 136 and the first bulkhead 154 are aligned with one another. The second bulkhead 156 is located forward of and proximate the B-pillar attachment section 130. The bracket 160 is located rearward of the B-pillar 114 but is located proximate or at a rearward end of the B-pillar attachment section 130.

The bracket 160 is welded to each of the lower horizontally extending section 150c, the upright extending section 150d and the upper horizontally extending section 150e within the B-pillar attachment section 130.

The forward member 162 includes an upper horizontal portion 162a, an upright portion 162b and a lower horizontal portion 162c. The upper horizontal portion 162a, the upright portion 162b and the lower horizontal portion 162c define a C-shape as viewed from one end as shown in FIG. 12. The upper horizontal portion 162a is welded to the upper horizontally extending section 150e of the outer sill member 150. The lower horizontal portion 162c is welded to the lower horizontally extending section 150c of the outer sill member 150. The upright portion 162b is spaced slightly apart from the upright extending section 150d of the outer sill member 150, but can, alternatively, be welded the upright extending section 150d of the outer sill member 150.

The forward panel 166 extends from the outer upper flange 150a to the outer lower flange 150b and is welded to each of the outer upper flange 150a to the outer lower flange 150b such that the forward panel 166 is sandwiched between the outer sill member 150 and the inner sill member 186.

Figure 14:
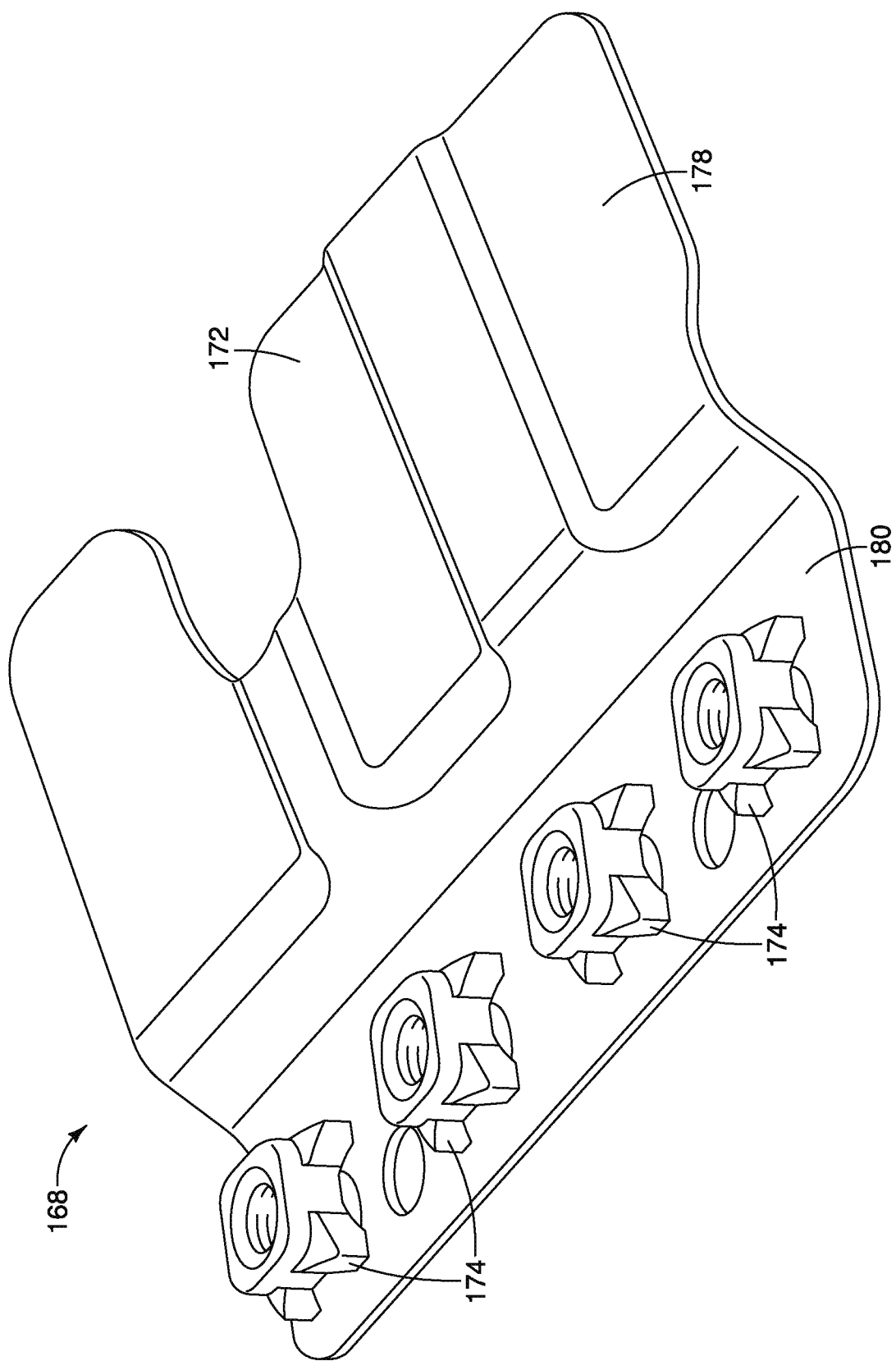
FIG. 14 is a perspective view of the first reinforcement bracket shown removed from the outer sill assembly in accordance with the second embodiment.

A description of the first reinforcement bracket 168 is now provided with initial reference to FIGS. 12-14. The first reinforcement bracket 168 is not shown in FIG. 16. The first reinforcement bracket 168 basically includes a contoured plate 172 and a plurality of fastener members 174. The contoured plate 172 is formed as a single, unitary, monolithic metal element. More specifically, the contoured plate 172 can be formed from a single piece of sheet metal that is bent, molded and/or otherwise formed into the shape depicted in FIG. 14. More specifically, the contoured plate 174 shaped to include a first horizontally oriented portion 178 and a second horizontally oriented portion 180. The first reinforcement bracket 168 is located rearward of the A-pillar 112 and the forward panel 166. The first reinforcement bracket 168 is further located forward of the B-pillar 114, and the first bulkhead 154.

The first horizontally oriented portion 178 (an outboard portion) and the second horizontally oriented portion 180 (inboard portion) are not co-planar but rather are angularly offset from one another defining an angle of between 150 degrees and 175 degrees. In other words, the first horizontally oriented portion 178 and the second horizontally oriented portion 180, once installed within the hollow area 170 of the sill structure 122, are not perfectly horizontal. Rather, the first horizontally oriented portion 178 and the second horizontally oriented portion 180 are approximately horizontal and are each angularly offset from true horizontal by an angle that is between 5 and 15 degrees, depending upon the overall design and shape of the sill structure 122. In the depicted embodiment, each of the first horizontally oriented portion 178 and the second horizontally oriented portion 180 is offset from true horizontal by between 5 and 7.5 degrees and offset from one another by between 165 and 170 degrees.

The first horizontally oriented portion 178 is oriented and shaped to overlay a portion of the lower horizontal portion 162c of the forward member 162 and is further welded thereto. The second horizontally oriented portion 180 is oriented and shaped to attach to the inner sill assembly 146 in a manner that is described further below.

Figure 18:
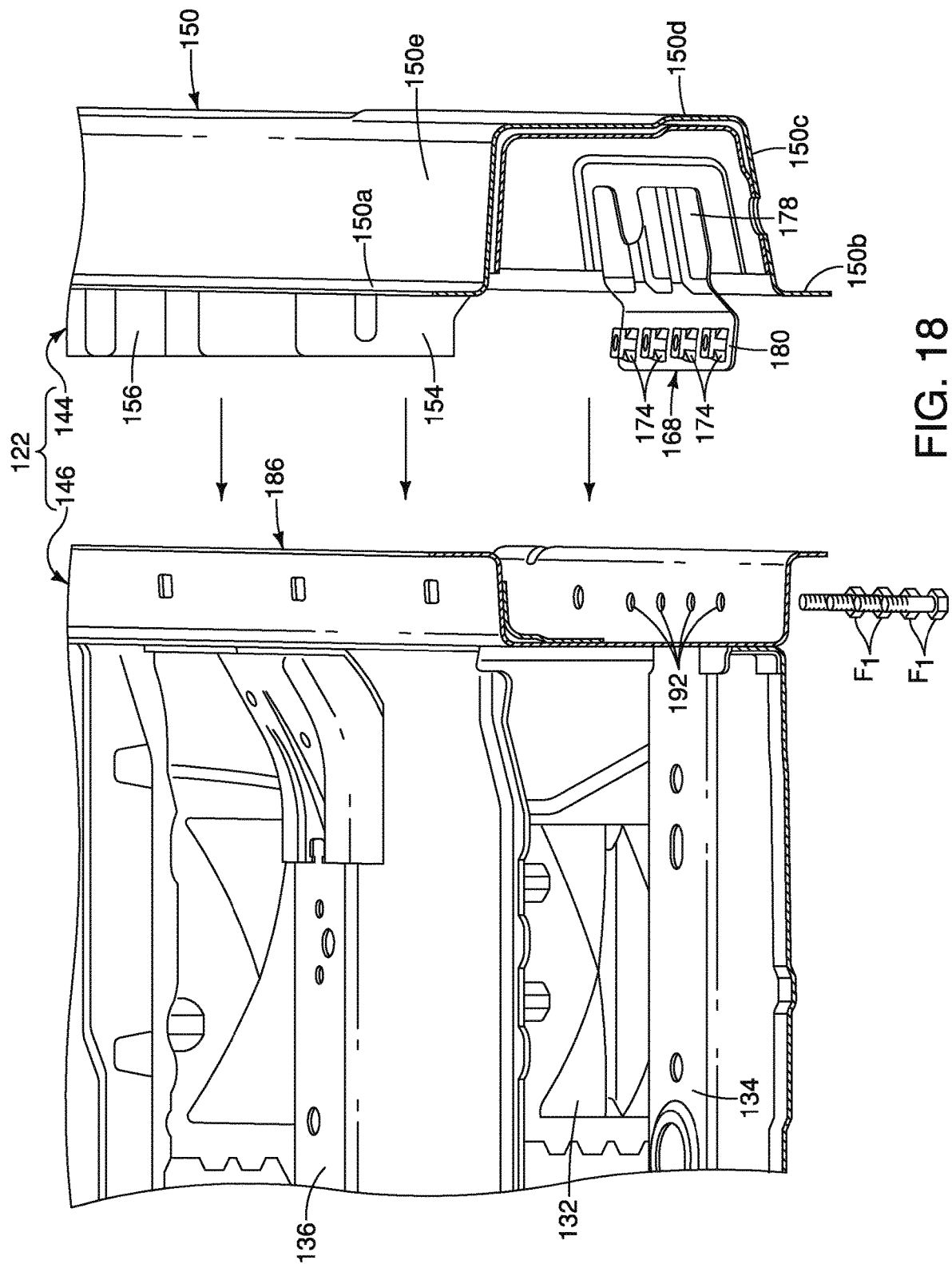
FIG. 18 is a second perspective exploded view of the sill structure showing the floor structure attached to the inner sill assembly and details of the outer sill assembly in accordance with the second embodiment.
Figure 19:
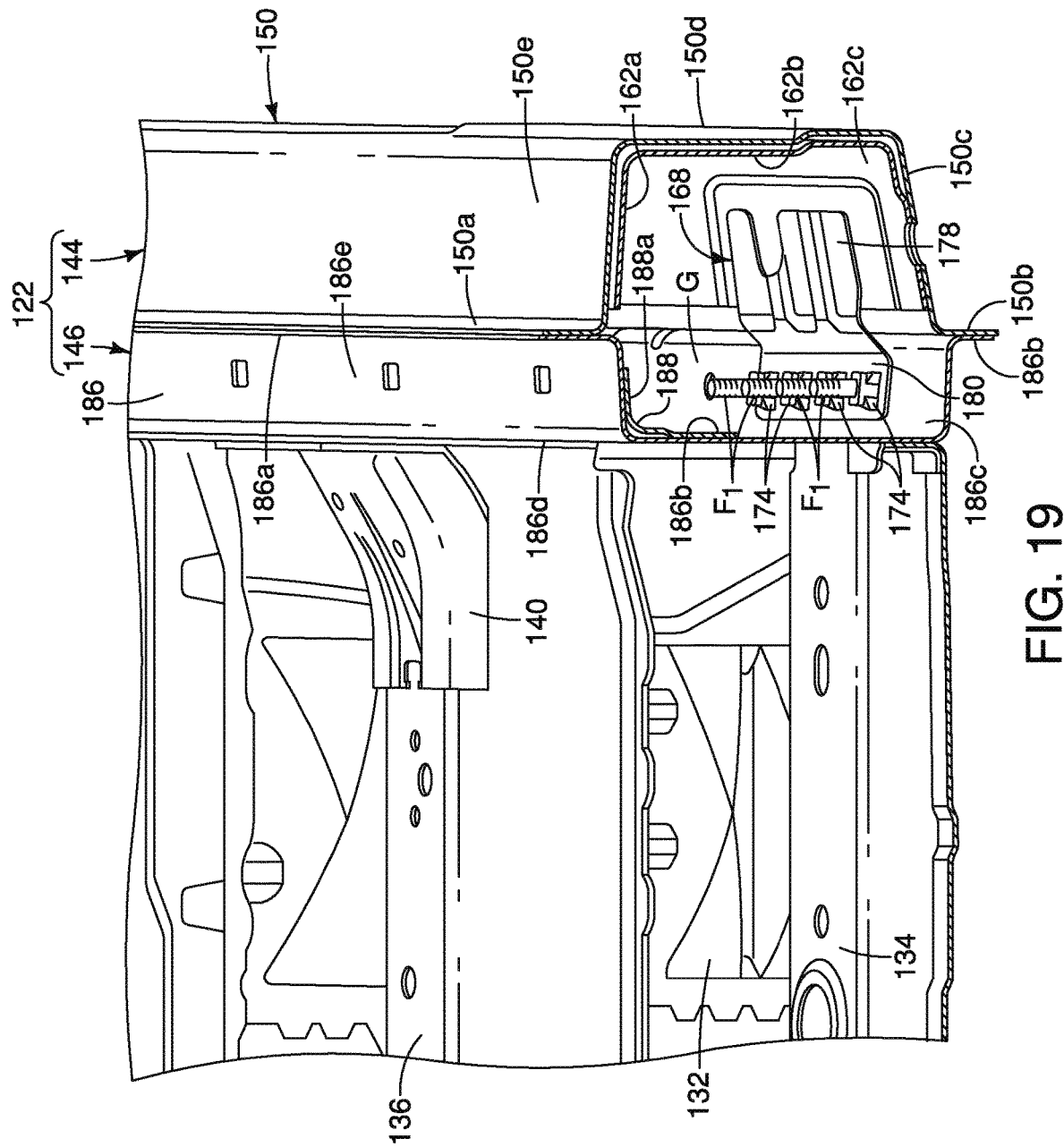
FIG. 19 is a third perspective view of the sill structure similar to FIG. 18 showing the floor structure attached to the inner sill assembly and the outer sill assembly attached to the inner sill assembly in accordance with the second embodiment.

The second horizontally oriented portion 180 extends in an inboard direction from the first horizontally oriented portion 178, as shown in FIG. 14. The fastener members 174 are welded to the second horizontally oriented portion 180 at spaced apart locations thereon. In the depicted embodiment, the fastener members 174 are threaded nuts that subsequently receive fasteners $F_1$, as shown in FIGS. 18 and 19.

A description of the inner sill assembly 146 is now provided initially with reference to FIGS. 12,13 and 15.

As shown in FIG. 13, the inner sill assembly 146 includes a forward panel 184, an inner sill member 186, an elongated member 188 and a second reinforcement bracket 190. The inner sill member 186 includes an inner upper flange 186a, an inner lower flange 186b, a lower horizontally extending section 186c, an upright extending section 186d and an upper horizontally extending section 186e. The lower horizontally extending section 186c, the upright extending section 186d and the upper horizontally extending section 186e have a C-shape as viewed in cross-section and together with the lower horizontally extending section 150c, the upright extending section 150d and the upper horizontally extending section 150e of the outer sill member 150 define the hollow area 170. The lower horizontally extending section 186c includes a plurality of openings 192 that are spaced apart from one another.

The inner upper flange 186a of the inner sill member 186 extends upward from the upper horizontally extending section 186c. The inner lower flange 186b extends downward from the lower horizontally extending section 186e. Similar to the outer sill member 150, the inner sill member 186 can be made as a single elongated metallic member or can be assembled from a plurality of separate plates that are welded together to define the inner sill member 186.

The inner upper flange 186a and the outer upper flange 150a are fixedly attached to one another, via, for example, welding techniques. The inner lower flange 186b and the outer lower flange 150b are fixedly attached to one another via, for example, welding techniques, thereby defining the sill structure 122 with hollow interior 170 being defined between the outer sill assembly 144 and the inner sill assembly 146.

The elongated member 188 is an elongated bracket that has an upper flange 188a and a lower flange 188b that are approximately perpendicular (angularly offset from one another by an angle of 190 degrees or more). The upper flange 188a is welded at various locations along its length to the upper horizontally extending section 186e. The lower flange 188b is welded at various locations along its length to the upright extending section 186d. The elongated member 188 extends within the hollow area 170 from a rear end of the inner sill member 186 forward approximately 70-80% of the overall length of the inner sill member 186, as shown in FIGS. 13 and 15.

The forward panel 184 is installed within the C-shaped hollow area of the inner sill member 186. The forward panel 184 includes a main panel portion 184a, an upper flange 184b and a forward flange 184c. The upper flange 184b is welded to the upper horizontally extending section 186e of the inner sill member 186. The forward flange 184c is welded to an adjacent forward portion of the inner sill member 186, as shown in FIG. 15.

As shown in FIGS. 13 and 15, the second reinforcement bracket 190 has an upright extending section 190a and a lower horizontally extending flange 190b. The upright extending flange 190a is attached at various locations along its length to the upright extending section 186d of the inner sill member 186 via welding techniques. The lower horizontally extending flange 190b is attached at various locations along its length to the lower horizontally extending section 186c of the inner sill member 186 via welding techniques.

As shown in FIG. 15, the second reinforcement bracket 190 is spaced apart from the forward panel 184 defining a gap G therebetween. Although not visible in FIG. 15, the openings 192 are located within the gap G.

One manufacturing process for constructing the vehicle body structure 110 includes first assembling and welding together the above described parts of the outer sill assembly 144. Similarly, the manufacturing process includes assembling and welding together the above described parts of the inner sill assembly 146.

Figure 17:
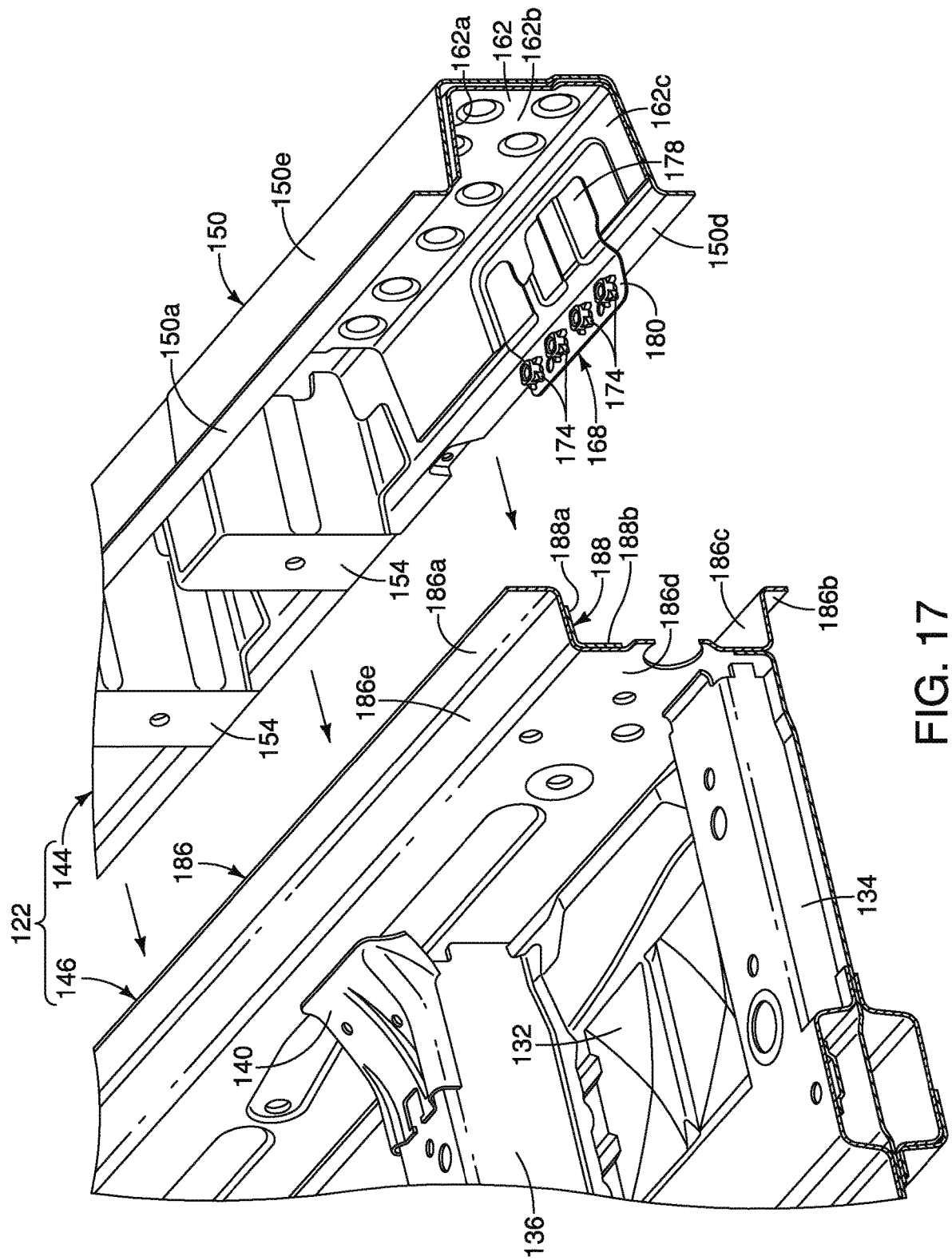
FIG. 17 is a first perspective exploded view of the sill structure showing the floor structure attached to the inner sill assembly and details of the inboard side of the outer sill assembly in accordance with the second embodiment.

As shown in FIGS. 17-19, during the manufacturing process, the outer sill assembly 144 (fully assembled) and the inner sill assembly 146 (fully assembled) are aligned and moved toward one another such that the following relationships are achieved. The outer upper flange 150a of the outer sill member 150 and the inner upper flange 186a of the inner sill member 186 are brought into contact with one another and mate with one another. At about the same time, the outer lower flange 150b of the outer sill member 150 and the inner lower flange 186b of the inner sill member 186 contact and mate with one another. Further, the second horizontally oriented portion 180 of the first reinforcement bracket 168 of the outer sill assembly 144, now located within the hollow interior 170, is fitted into the space defined by the gap G along the lower horizontally extending flange 190c of the second reinforcement bracket 190 of the inner sill assembly 146.

The openings 192 in the lower horizontally extending section 186c and the fastener members 174 of the second horizontally oriented portion 180 of the first reinforcement bracket 168 align such that fasteners Ft are inserted through corresponding ones of the openings 192 and threaded into corresponding ones of the fastener members 174 of the first reinforcement bracket 168.

At about the same time the fasteners Ft are installed, the outer upper flange 150a of the outer sill member 150 and the inner upper flange 186a of the inner sill member 186 are welded to one another. Similarly, the outer lower flange 150b of the outer sill member 150 and the inner lower flange 186b of the inner sill member 186 arc welded to one another to produce the fully assembled sill structure 122. Thereafter, the sill structure 122 is attached to (for example, welding techniques) the A-pillar 112, the B-pillar 114, the C-pillar 116 and the floor structure 120 thereby at least partially defining the vehicle body structure 110. As shown in FIG. 11, the lower end 114a of the B-pillar 114 is attached to the sill structure 122 at the B-pillar attachment section 130. The B-pillar 114 is attached to both the outer sill member 150 of the outer sill assembly 144 and the inner sill member 146 of the inner sill assembly 146 via welding techniques.

As shown in FIGS. 12, 17, 18 and 19 in the first embodiment, the second horizontally oriented portion 180 of the first reinforcement bracket 168 has a non-contacting relationship with the second reinforcement bracket 190 with the sill structure 122 fully assembled.

One of the benefits of the inclusion of the first reinforcement bracket 168 in the sill structure 122 is the connection between the lower horizontally extending section 150c of the outer sill member 150 and the lower horizontally extending section 186c of the inner sill member 186 at a location forward of the B-pillar 114 and the B-pillar attachment section 130, and, adjacent to (and rearward of) the A-pillar 112. This connection provides added strength to the sill structure 122. The connection established by the first reinforcement bracket 168 between the outer sill assembly 144 and the inner sill assembly 146 along with the second reinforcement bracket 190 within the inner sill assembly 146 further adds strength and rigidity to resist rotation of the sill structure proximate the A-pillar 112 in response an impact event where impact force is applied to the B-pillar 114.

The various components of the vehicle body structure described above (other for the sill structures 22 and 122) are conventional components that are well known in the art. Since such components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

2) In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   an inner sill member having an inner upper flange, a horizontally extending section and an inner lower flange extending downward from the horizontally extending section;
   an outer sill member having an outer upper flange and an outer lower flange, the inner upper flange and the outer upper flanges being fixedly attached to one another, and the inner lower flange and the outer lower flanges being fixedly attached to one another defining a sill structure with hollow interior; and
   a first reinforcement bracket disposed within the hollow interior and having an outboard portion fixedly attached to the outer sill member and an inboard portion fixedly attached to the horizontally extending section of the inner sill member,
   the inner sill member further including an upper horizontally extending section and an upright extending section that extends downward from the upper horizontally extending section, with the horizontally extending section extending from a lower end of the upright extending section, the first reinforcement bracket having a non-contacting relationship with the upright extending section.

2. The vehicle body structure according to claim 1, further comprising:
   a second reinforcement bracket having an upper horizontally extending flange, an upright extending section and a lower horizontally extending flange with at least the upper horizontally extending flange and the lower horizontally extending flange being attached to the inner sill member.

3. A vehicle body structure, comprising:
   an inner sill member having an inner upper flange, a horizontally extending section and an inner lower flange extending downward from the horizontally extending section;
   an outer sill member having an outer upper flange and an outer lower flange, the inner upper flange and the outer upper flanges being fixedly attached to one another, and the inner lower flange and the outer lower flanges being fixedly attached to one another defining a sill structure with hollow interior;
   a first reinforcement bracket disposed within the hollow interior and having an outboard portion fixedly attached to the outer sill member and an inboard portion fixedly attached to the horizontally extending section of the inner sill member; and
   a second reinforcement bracket having an upper horizontally extending flange, an upright extending section and a lower horizontally extending flange with at least the upper horizontally extending flange and the lower horizontally extending flange being attached to the inner sill member, the lower horizontally extending flange of the second reinforcement bracket defines a gap dimensioned to receive the inboard portion of the first reinforcement member such that the lower horizontally extending flange and the inboard portion of the first reinforcement member are spaced apart from one another within the gap.

4. The vehicle body structure according to claim 3, wherein the outboard portion of the first reinforcement bracket is welded to the outer sill member, and the inboard portion of the first reinforcement bracket is fixedly attached to the horizontally extending section of the inner sill member via a plurality of mechanical fasteners.

5. The vehicle body structure according to claim 3, wherein the first reinforcement bracket includes an alignment projection that extends in an inboard direction parallel to the inboard portion of the first reinforcement bracket such that the alignment projection overlays a part of the lower horizontally extending flange of the second reinforcement bracket.

6. The vehicle body structure according to claim 1, further comprising:

a second reinforcement bracket having an upright extending section and a lower horizontally extending flange with at least the lower horizontally extending flange being attached to the inner sill member.

7. The vehicle body structure according to claim 6, wherein the first reinforcement bracket is located forward of the second reinforcement bracket such that the first reinforcement member and the second reinforcement member are spaced apart from one another relative to a vehicle longitudinal direction.

8. The vehicle body structure according to claim 1, wherein the outboard portion of the first reinforcement bracket is welded to the outer sill member, and the inboard portion of the first reinforcement bracket is fixedly attached to the horizontally extending section of the inner sill member via a plurality of mechanical fasteners.

9. The vehicle body structure according to claim 8, wherein the outboard portion of the first reinforcement bracket includes a horizontally extending section and an upright extending section, the inboard portion extending inboard from the horizontally extending section, the upright extending section extending upward from the horizontally extending section, and the horizontally extending section being welded to a lower horizontal section of the outer sill member and the upright extending section of the first reinforcement bracket being welded to an upright extending section of the outer sill member.

10. The vehicle body structure according to claim 1, wherein the outer sill member further having an upright extending section, an upper horizontally extending section that extends along an upper end of the upright extending section, and lower horizontally extending section that extends along a lower end of the upright extending section, with the outer upper flange extending upward from an inboard end of the upper horizontally extending section and the outer lower flange extending downward from an inboard end of the lower horizontally extending section.

11. The vehicle body structure according to claim 1, further comprising:

an A-pillar rigidly fixed to a forward end of the sill structure defined by the inner sill member and the outer sill member, and a B-pillar fixed to the sill structure at a location rearward of the A-pillar, the A-pillar, the B-pillar and the sill member at least partially defining a front door opening.

12. The vehicle body structure according to claim 11, wherein the first reinforcement bracket is located rearward of the A-pillar and forward of the B-pillar.

13. The vehicle body structure according to claim 12, further comprising:

a second reinforcement bracket having an upper horizontally extending flange, an upright extending section and a lower horizontally extending flange with at least the upper horizontally extending flange and the lower horizontally extending flange being attached to the inner sill member.

14. A vehicle body structure, comprising an inner sill member having an inner upper flange, a horizontally extending section and an inner lower flange extending downward from the horizontally extending section;

an outer sill member having an outer upper flange and an outer lower flange, the inner upper flange and the outer upper flanges being fixedly attached to one another, and the inner lower flange and the outer lower flanges being fixedly attached to one another defining a sill structure with hollow interior;

a first reinforcement bracket disposed within the hollow interior and having an outboard portion fixedly attached to the outer sill member and an inboard portion fixedly attached to the horizontally extending section of the inner sill member;

an A-pillar rigidly fixed to a forward end of the sill structure defined by the inner sill member and the outer sill member;

a B-pillar fixed to the sill structure at a location rearward of the A-pillar, the A-pillar, the B-pillar and the sill member at least partially defining a front door opening, the first reinforcement bracket being located rearward of the A-pillar and forward of the B-pillar; and a second reinforcement bracket having an upper horizontally extending flange, an upright extending section and a lower horizontally extending flange with at least the upper horizontally extending flange and the lower horizontally extending flange being attached to the inner sill member, the lower horizontally extending flange of the second reinforcement bracket defines a gap dimensioned to receive the inboard portion of the first reinforcement member such that the lower horizontally extending flange and the inboard portion of the first reinforcement member are spaced apart from one another within the gap.

15. The vehicle body structure according to claim 13, wherein the outboard portion of the first reinforcement bracket is welded to the outer sill member, and the inboard portion of the first reinforcement bracket is fixedly attached to the horizontally extending section of the inner sill member via a plurality of mechanical fasteners.

16. The vehicle body structure according to claim 14, wherein
the first reinforcement bracket includes an alignment projection that extends in an inboard direction parallel to the inboard portion of the first reinforcement bracket such that the alignment projection overlays a part of the lower horizontally extending flange of the second reinforcement bracket.

17. The vehicle body structure according to claim 12, further comprising:
a second reinforcement bracket having an upright extending section and a lower horizontally extending flange with at least the lower horizontally extending flange being attached to the inner sill member.

18. The vehicle body structure according to claim 17, wherein
the first reinforcement bracket is located forward of the second reinforcement bracket such that the first reinforcement member and the second reinforcement member are spaced apart from one another relative to a vehicle longitudinal direction.

* * * * *